United States Patent
Hwang

(10) Patent No.: US 11,501,755 B2
(45) Date of Patent: Nov. 15, 2022

(54) APPARATUS AND METHOD FOR PROVIDING VOICE ASSISTANT SERVICE

(71) Applicant: SAMSUNG ELECTRONICS CO., LTD., Suwon-si (KR)

(72) Inventor: Inchul Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/009,296

(22) Filed: Sep. 1, 2020

(65) Prior Publication Data
US 2021/0065685 A1 Mar. 4, 2021

(30) Foreign Application Priority Data
Sep. 2, 2019 (KR) .................. 10-2019-0108468

(51) Int. Cl.
*G10L 15/07* (2013.01)
*G10L 15/06* (2013.01)
*G10L 15/16* (2006.01)
*G10L 15/22* (2006.01)

(52) U.S. Cl.
CPC .......... *G10L 15/075* (2013.01); *G10L 15/063* (2013.01); *G10L 15/16* (2013.01); *G10L 2015/0638* (2013.01); *G10L 2015/227* (2013.01)

(58) Field of Classification Search
None
See application file for complete search history.

(56) References Cited

U.S. PATENT DOCUMENTS

| 10,019,670 | B2 | 7/2018 | Gilbert |
| 10,521,723 | B2 | 12/2019 | Hwang et al. |
| 10,832,010 | B2* | 11/2020 | Luke ................ H04L 51/02 |
| 2012/0265536 | A1* | 10/2012 | Paik ................ G10L 15/22 704/270 |

(Continued)

FOREIGN PATENT DOCUMENTS

| KR | 10-1790092 B1 | 10/2017 |
| KR | 10-2018-0068850 A | 6/2018 |

(Continued)

OTHER PUBLICATIONS

Communication dated Nov. 25, 2020 issued by the International Searching Authority in counterpart Application No. PCT/KR2020/011502 (PCT/ISA/220, PCT/ISA/210, and PCT/ISA/237).

(Continued)

*Primary Examiner* — Shaun Roberts
(74) *Attorney, Agent, or Firm* — Sughrue Mion, PLLC

(57) ABSTRACT

Provided are an electronic device and method for providing a voice assistant service. The method, performed by the electronic device, of providing the voice assistant service includes: obtaining a voice of a user; obtaining voice analysis information of the voice of the user by inputting the voice of the user to a natural language understanding model; determining whether a response operation with respect to the voice of the user is performable, according to a preset criterion, based on the obtained voice analysis information; and based on the determining that the response operation is not performable, outputting a series of guide messages for learning the response operation related to the voice of the user.

14 Claims, 15 Drawing Sheets

(56) References Cited

U.S. PATENT DOCUMENTS

| | | | |
|---|---|---|---|
| 2014/0201629 A1 | 7/2014 | Heck | |
| 2014/0267045 A1 | 9/2014 | Grieves et al. | |
| 2014/0278413 A1 | 9/2014 | Pitschel et al. | |
| 2017/0300831 A1 | 10/2017 | Gelfenbeyn et al. | |
| 2018/0165581 A1 | 6/2018 | Hwang et al. | |
| 2018/0247065 A1 | 8/2018 | Rhee et al. | |
| 2019/0103101 A1* | 4/2019 | Danila | G06F 40/35 |
| 2019/0103103 A1* | 4/2019 | Ni | G06F 3/167 |
| 2020/0043476 A1 | 2/2020 | Hwang | |
| 2020/0074993 A1 | 3/2020 | Lee et al. | |
| 2020/0310749 A1* | 10/2020 | Miller | G06F 9/4881 |

FOREIGN PATENT DOCUMENTS

| | | |
|---|---|---|
| KR | 10-2018-0071931 A | 6/2018 |
| KR | 10-2018-0099423 A | 9/2018 |
| WO | 2018/155810 A1 | 8/2018 |
| WO | 2020/262811 A1 | 12/2020 |

OTHER PUBLICATIONS

Communication dated Jul. 12, 2022, issued by the European Patent Office in European Application No. 20860335.7.

* cited by examiner

APPARATUS AND METHOD FOR PROVIDING VOICE ASSISTANT SERVICE

CROSS-REFERENCE TO RELATED APPLICATION(S)

This application is based on and claims priority under 35 U.S.C. § 119 to Korean Patent Application No. 10-2019-0108468, filed on Sep. 2, 2019, in the Korean Intellectual Property Office, the disclosures of which are incorporated by reference herein in its entirety.

BACKGROUND

1. Field

The disclosure relates to providing a voice assistant service. More particularly, the disclosure relates to training a voice assistant service model that provides a voice assistant service.

2. Description of Related Art

An artificial intelligence (AI) system is a system in which machines learn, judge, and become smart, unlike existing Rule-based smart systems. As the AI systems are used, the AI systems are increasingly recognizing and improving their understanding of a user's preferences, and thus, existing rule-based smart systems have been gradually replaced with deep-learning-based AI systems.

AI technology consists of machine learning (deep learning) and element technologies that utilize machine learning.

Machine learning is an algorithm technology that classifies/learns the characteristics of input data by itself. Element technology is a technology that utilizes machine learning algorithms such as deep learning, and consists of technical fields such as linguistic understanding, visual understanding, reasoning/prediction, knowledge representation, and motion control.

Various fields in which AI technology is applied are as follows. Linguistic understanding is a technique for recognizing, applying, and processing human language/characters, and includes natural language processing, machine translation, dialogue system, query response, speech recognition/synthesis, and the like. Visual understanding is a technique for recognizing and processing objects as human vision, and includes object recognition, object tracking, image search, human recognition, scene understanding, spatial understanding, image enhancement, etc. Reasoning/prediction is a technique for judging and logically inferring and predicting information and includes knowledge/probability-based reasoning, optimization prediction, preference base planning, and recommendation. Knowledge representation is a technique for automating human experience information into knowledge data and includes knowledge building (data generation/classification) and knowledge management (data utilization). Motion control is a technique for controlling autonomous travel of a vehicle and motion of a robot, and includes motion control (navigation, collision, traveling), operation control (behavior control), etc.

In addition, a technology to effectively provide a voice assistant service while using AI technology is required. In detail, when the voice assistant service is provided, a technique for effectively protecting personal privacy is necessary.

SUMMARY

Provided are an apparatus and a method for providing an assistant service.

Provided are an apparatus and a method for providing a voice assistant service, whereby an operation with respect to received user voice may be learnt when the user voice that is determined to be not proper for executing an operation is received.

Additional aspects will be set forth in part in the description which follows and, in part, will be apparent from the description, or may be learned by practice of the presented embodiments.

In accordance with an aspect of the disclosure, a method, performed by an electronic device, of providing a voice assistant service includes obtaining voice of a user, obtaining voice analysis information of the voice of the user by inputting the voice of the user to a natural language understanding (NLU) model, determining whether a response operation with respect to the voice of the user is performable according to a preset criterion, based on the obtained voice analysis information, and when it is determined that the response operation is not performable, outputting a series of guide messages for learning the response operation related to the voice of the user.

The method may further include receiving an input sequence input from the user according to the output guide messages.

The method may further include training a voice assistant service model for learning the response operation by using the input sequence.

The input sequence may include at least one of a voice input, a key input, a touch input, or a motion input from the user.

The voice analysis information may include at least one of intent information regarding intention of the user or slot information that is necessary for providing a response operation corresponding to the intention of the user.

The method may further include dividing the input sequence in preset units by using an inference model for inferring an intention of the input sequence, grouping the divided input sequence into a plurality of input groups based on intent information represented by the divided input sequence, and identifying the intent information for each of the plurality of input groups by using the inference model, wherein the training of the voice assistant service model may further include training the voice assistant service model based on the plurality of input groups and the intent information for each of the plurality of input groups.

The method may further include generating a similar sequence related to the input sequence by inputting the input sequence to a similar sequence generation model, and training the voice assistant service model based on the generated similar sequence, the plurality of input groups, and the intent information for each of the plurality of input groups.

The voice assistant service model may be an AI algorithm trained by using at least one of machine learning, neural network, genes, deep learning, or classification algorithm.

The outputting of the guide messages includes, when a trigger input set in advance is input from the user, outputting the guide messages.

The determining of whether the response operation with respect to the voice of the user is performable may further include determining whether the response operation with respect to the voice of the user is performable, by using the voice assistant service model that is trained based on the generated similar sequence, the plurality of input groups, and the intent information for each of the plurality of input groups.

In accordance with an aspect of the disclosure, an electronic device for providing a voice assistant service includes: a memory storing one or more instructions; and at least one processor configured to execute the one or more instructions to obtain voice of a user, obtain voice analysis information of the voice of the user by inputting the voice of the user to an NLU model, determine whether a response operation with respect to the voice of the user is performable according to a preset criterion, based on the obtained voice analysis information, and when it is determined that the response operation is not performable, output a series of guide messages for learning the response operation related to the voice of the user.

The at least one processor may be further configured to execute the one or more instructions to receive an input sequence input from the user according to the output guide messages.

The at least one processor may be further configured to execute the one or more instructions to train a voice assistant service model for learning the response operation by using the input sequence.

The input sequence may include at least one of a voice input, a key input, a touch input, or a motion input from the user.

The voice analysis information may include at least one of intent information regarding intention of the user or slot information that is necessary for providing a response operation corresponding to the intention of the user.

The at least one processor may be further configured to execute the one or more instructions to divide the input sequence in preset units by using an inference model for inferring an intention of the input sequence, group the divided input sequence into a plurality of input groups based on intent information represented by the divided input sequence, identify the intent information for each of the plurality of input groups by using the inference model, and train the voice assistant service model for learning the response operation based on the plurality of input groups and the intent information for each of the plurality of input groups.

The at least one processor may be further configured to execute the one or more instructions to generate a similar sequence related to the input sequence by inputting the input sequence to a similar sequence generation model, and train the voice assistant service model based on the generated similar sequence, the plurality of input groups and the intent information for each of the plurality of input groups.

The voice assistant service model may be an AI algorithm trained by using at least one of machine learning, neural network, genes, deep learning, or classification algorithm.

The at least one processor may be further configured to execute the one or more instructions to output the guide messages, when a trigger input set in advance is input from the user.

In accordance with an aspect of the disclosure, a computer-readable recording medium stores thereon a program for executing a method of providing voice assistant service, wherein the method includes obtaining voice of a user, obtaining voice analysis information of the voice of the user by inputting the voice of the user to an NLU model, determining whether a response operation with respect to the voice of the user is performable according to a preset criterion, based on the voice analysis information, and when it is determined that the response operation is not performable, outputting a series of guide messages for learning the response operation related to the voice of the user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
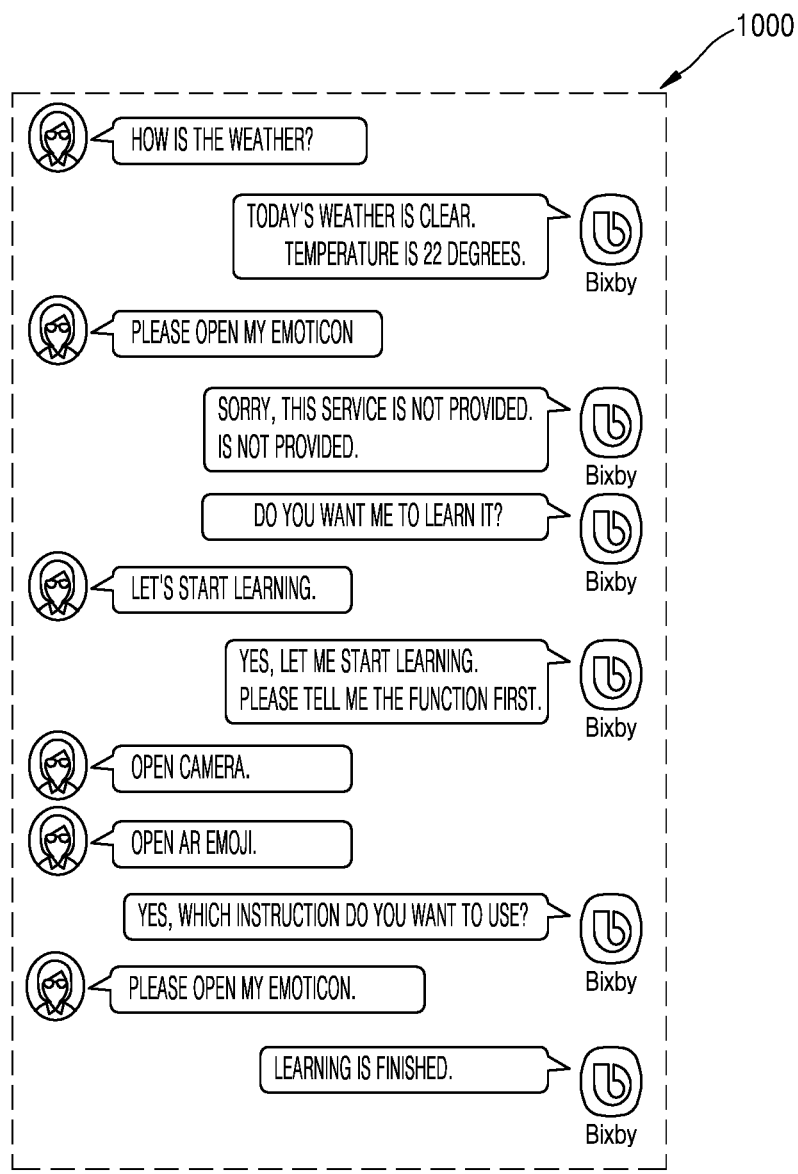
FIGS. 1A and 1B illustrate providing a voice assistant service according to an embodiment.

The terminology used herein will be described briefly, and embodiments will be described in detail.

All terms including descriptive or technical terms which are used herein should be construed as having meanings that are known to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

It will be further understood that the terms "comprise" and/or "comprising," when used in this specification, specify the presence of stated components, but do not preclude the presence or addition of one or more components. In addition, the terms such as " . . . unit", "module", etc. provided herein indicates a unit performing at least one function or operation, and may be realized by hardware, software, or a combination of hardware and software.

As used herein, the expression "at least one of a, b or c" indicates only a, only b, only c, both a and b, both a and c, both b and c, all of a, b, and c, or variations thereof.

Hereinafter, certain embodiments will be described in detail with reference to accompanying drawings. However, embodiments may be implemented in various manners, and is not limited to embodiments described herein. In addition, components irrelevant with the description are omitted in the drawings for clear description, and like reference numerals are used for similar components throughout the entire specification.

Figure 1B:
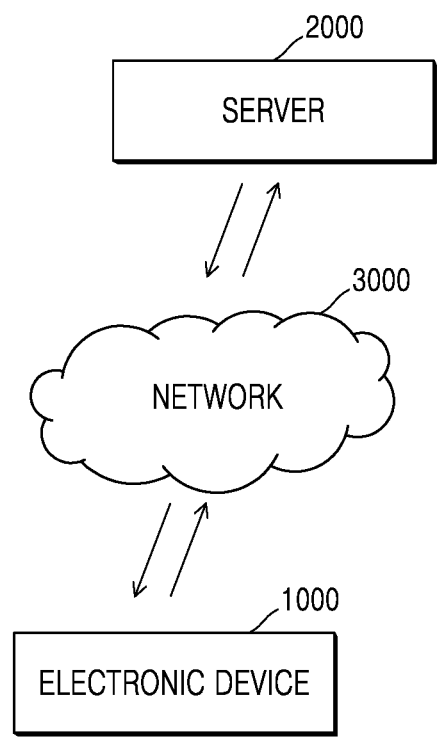

FIGS. 1A and 1B illustrate processes a voice assistant service according to an embodiment.

According to an embodiment, an electronic device 1000 may provide a voice assistant service. The electronic device 1000 may perform a response operation with respect to user voice by using the voice assistant service. For example, when the user voice is acquired by using the voice assistant service, the electronic device 1000 may perform at least one function executable by the electronic device as a response operation with respect to the user voice. Also, the electronic device 1000 may output a response message as visual information or auditory information, as a response operation with respect to the acquired user voice.

In order to provide the voice assistant service, the electronic device 1000 may include various models, e.g., an automatic speech recognition (ASR) model, an NLU model, a dialogue management (DM) model, an action planning (AP) model, a natural language generator (NLG) model, a text to speech (TTS) model, etc. For example, the ASR model may receive an input of user voice and convert the input user voice into text. According to an embodiment, the ASR model may convert the user voice into the text by identifying an acoustic pattern represented by phonemes of the user voice.

The NLU model may receive an input of a text converted from user voice, and then may output intent information or slot information of the user voice by analyzing the input text in syntactic units (e.g., words, phrases, morphemes, etc.).

The DM model generates a dialog management map by analyzing context meaning represented in a relationship between a series of guide messages output from the electronic device 1000 and a user input sequence for the output series of guide messages, and may manage the context meaning between the series of guide messages output from the electronic device and the user input sequences with respect to the series of guide messages by using at least one dialogue path in the generated dialog management map.

The AP model may manage an overall sequence of response operations for providing the voice assistant service. The voice assistant service may execute the response operations with respect to the user voice based on the sequence of the response operations determined in the AP model.

The NLG model may output new text that follows a certain sentence rules by using text information that has been registered earlier and text information newly identified by the NLU model based on the intent information or the slot information.

The TTS model receives an input of text information and may convert the input text information into speech type information. For example, the TTS model may convert the text that is newly generated by the NLG model into speech type information that a user may recognize, and may transfer the speech type information to an outputter of the electronic device 1000.

The electronic device 1000 may obtain the user voice and may determine whether the response operation for the obtained user voice is performable. For example, the electronic device 1000 may identify, by using the NLU model, at least one of the intent information that is required to determine the response operation from the obtained user voice or the slot information that is required to determine a parameter related to the response operation corresponding to the intent, and may determine whether the response operation is performable by using the at least one of the intent information or the slot information that is identified.

According to an embodiment, when the user voice is obtained, the electronic device 1000 converts the user voice into text by using the ASR model. The electronic device 1000 may obtain confidence score of the converted text, with the converted text. The confidence score may denote a probability that the obtained user voice corresponds to the converted text. The electronic device 1000 may determine whether the response operation with respect to the obtained user voice is performable, based on the confidence score. That is, when the confidence score is equal to or less than a threshold value set in advance, the electronic device 1000 may determine that the response operation is not performable.

According to an embodiment, the electronic device 1000 may determine at least one of intent information or slot information of the obtained user voice, by analyzing the converted text corresponding to the obtained user voice by using the NLU model. The electronic device 1000 may obtain a probability value with respect to the intent information or the slot information, together with the intent information or the slot information. Here, the probability value may denote a probability that the converted text would correspond to the determined intent information or the slot information. The electronic device 1000 may determine whether the response operation with respect to the obtained user voice is performable, based on the probability value. That is, when the probability value is equal to or less than a threshold value set in advance, the electronic device 1000 may determine that the response action is not performable.

According to an embodiment, the electronic device 1000 may determine whether the response operation with respect to the user voice is performable, based on a current operation state of the electronic device. The electronic device 1000 determines whether a computer-readable instruction corresponding to the intent information and the slot information of the user voice determined through the NLU model is about an operation that is executable in the current operation state of the electronic device, and when the command is about the operation executable in the current operation state of the electronic device, the electronic device 1000 may determine that the response operation with respect to the user voice is performable.

According to an embodiment, when the computer-readable instruction corresponding to the intent information and the slot information obtained from the recognized user voice is not the instruction related to the operation executable in the current operation state of the electronic device, the electronic device 1000 may determine that the response action with respect to the user voice is not performable.

According to an embodiment, whether the computer-readable instruction corresponding to the intent information and the slot information is about the operation executable in the current operation state of the electronic device may be set in advance by a voice assistant service provider. That is, the electronic device 1000 may store instructions about operations defined in advance by the voice assistant service provider in a memory or a database, as the instructions executable in the current operation state of the electronic device.

For example, when it is determined that the response operation corresponding to the user voice is performable, the electronic device 1000 may perform the at least one function of the electronic device, which is related to the response operation corresponding to the user voice. According to an embodiment, the electronic device 1000 may output one response operation with respect to the user voice, but is not limited thereto, that is, the electronic device 1000 may output a series of response operations about two or more functions of the electronic device or a series of response operations about two or more functions of the electronic device in a preset order.

According to an embodiment, when the user voice is obtained, the electronic device 1000 may convert the voice into a text such as "how is the weather" by using the ASR model. Here, when the confidence score obtained with the converted text is equal to or greater than the threshold value set in advance, the electronic device 1000 may recognize the user voice and may determine that the response operation with respect to the user voice is performable.

When the confidence score is equal to or greater than the preset threshold value, the electronic device 1000 applies the text such as "how is the weather" to the NLU model to determine at least one of the intent information or the slot information. The electronic device 1000 may obtain intent information and a probability value about the intent information through the NLU model, and may determine that the intent information may be determined when the obtained probability value is equal to or greater than the preset threshold value. Also, similarly to the intent information, when it is determined that the slot information may be determined from the user voice such as "how is the weather", the electronic device 1000 may determine that the response operation with respect to the user voice is performable.

According to an embodiment, when the intent information and the slot information are both determined from the user voice such as "how is the weather" through the NLU model, the electronic device 1000 may determine that the response operation with respect to the user voice such as "how is the weather" is performable.

When the electronic device 1000 determines that the response operation is performable with respect to the user voice such as "how is the weather" that may be recognized, the electronic device 1000 may access a weather service to request information about today's weather and may obtain the information about today's weather from the weather service as a response to the request.

The electronic device 1000 may generate a response message such as "today's weather is clear, and the temperature is 22 degrees Celsius" by using the information about today's weather obtained from the weather service, and may output information about the generated response message. According to an embodiment, the electronic device 1000 may output a plurality of response messages together or may sequentially output the plurality of response messages in a preset order.

In more detail, the electronic device 1000 may determine the intent information as "search for weather information" and the slot information as "today's weather" through the NLU model, and may obtain a computer-readable instruction corresponding to the determined intent information and the slot information. The computer-readable instruction corresponding to "search for weather information" may be determined to include "accessing weather service", "weather search request", "obtain search result", and "provide search result". The computer-readable instruction corresponding to the slot information may be an instruction to use "today's weather" as query information when the instruction "weather search request" from among the instructions corresponding to the intent information is executed.

According to an embodiment, the electronic device 1000 may obtain user voice such as "please open my emoticon" from the user. The electronic device 1000 may determine whether the response operation with respect to the user voice "please open my emoticon" is performable.

For example, the electronic device 1000 inputs the user voice such as "please open my emoticon" into the ASR model to obtain the text "please open my emoticon" corresponding to the user voice and a confidence score with respect to the text, and determines whether the user voice may be recognized. When the confidence value corresponding to the text "please open my emoticon" is equal to or less than a threshold value set in advance, the electronic device 1000 may determine that the response operation with respect to the user voice is not performable.

According to an embodiment, the electronic device 1000 obtains the text "please open my emoticon" and the confidence score with respect to the text, and then, even when the confidence score is equal to or greater than the threshold value set in advance, the electronic device 1000 may determine that the response operation with respect to the user voice such as "please open my emoticon" is not performable, by using the NLU model.

When the confidence score is equal to or greater than the preset threshold value, the electronic device 1000 applies the text such as "please open my emoticon" to the NLU model to determine at least one of the intent information or the slot information. The electronic device 1000 may obtain intent information and a probability value about the intent information through the NLU model, and may determine that the intent information cannot be determined when the obtained probability value is equal to or less than the preset threshold value.

When it is determined that the intent information cannot be determined from the user voice such as "please open my emoticon", the electronic device 1000 may determine that the response operation with respect to the user voice is not performable.

Also, similarly to the intent information, when it is determined that the slot information cannot be determined from the user voice such as "please open my emoticon", the electronic device 1000 may determine that the response operation with respect to the user voice is not performable.

In more detail, although the electronic device 1000 determines the intent information as "execute emoji" and the slot information as "emoji" through the NLU model, it may be determined that a probability value corresponding to the determined intent information and the slot information is equal to or less than a threshold value set in advance. When information regarding the text and similar text that is similar to the text are missing in training data used to train the NLU model, the probability value of each of the intent information and the slot information may have a small value even when the intent information and the slot information corresponding to the input text are output. That is, because the text 'emoticon' is not used as training data when training the NLU model, 'emoji' which is similar text to the text 'emoticon' affects determining of the intent information and the slot information. In addition, because the text 'emoji' is similar to, but is not the same as, the text 'emoticon', a low probability value may be output.

Even when the probability value of the intent information and the slot information corresponding to the text "please open my emoticon" is equal to or greater than the threshold value set in advance, the electronic device 1000 may determine that the response operation with respect to the user voice is not performable, taking into account the current operation state of the electronic device.

When the probability value of the intent information and the slot information is equal to or greater than the preset threshold value, the electronic device 1000 may recognize the computer-readable instruction corresponding to the text such as "please open my emoticon".

When the recognized computer-readable instruction is not about the response operation executable by the electronic device taking into account the current operation state of the electronic device, the electronic device 1000 may determine that the response operation with respect to the user voice is not performable.

Whether the electronic device 1000 is capable of performing the response operation with respect to the user voice may vary depending on the current operation state of the electronic device. For example, the operation state of the electronic device 1000 may vary depending on at least one of the functions of the electronic device, which is currently being executed by the electronic device, based on a screen currently displayed by the electronic device 1000, a kind of the application currently being executed by the electronic device 1000, functions included in the application that is being executed currently, an update status of the currently executed application, and a series of user inputs input to the electronic device 1000.

For example, even when intent information and slot information corresponding to the text "please open my emoticon" are determined, when there is no application having a function related to the emoticon from among applications that are installed on the electronic device 1000, the electronic device 1000 may determine that the response operation with respect to the user voice such as "please open my emoticon" is not performable.

An electronic device providing a voice assistant service according to the related art could only output an error message such as "sorry, this service is not provided" when it is determined that the response operation corresponding to obtained user voice is not performable. However, when it is determined that the response operation with respect to the user voice is not performable, the electronic device 1000 according to an embodiment may output a series of guide messages for learning a response operation regarding the user voice.

According to an embodiment, when it is determined that the response operation with respect to the user voice is not performable, the electronic device 1000 may output a guide message such as "do you want me to learn it?" with an error message such as "sorry, this service is not provided.", or may sequentially output a series of guide messages for learning the response operation after outputting the error message.

According to an embodiment, after the electronic device 1000 outputs the error message, the series of guide messages for training the response operation may include, but is not limited to, a learning confirmation request message such as "Do you want me to learn it?", a learning start guide message such as "let me start learning, please tell me the operation", a learning supplement message such as "please tell me in detail.", an instruction setting request message such as "yes, which command do you want to use?", and other messages which are required to learn the response operation with respect to the user voice by interacting with the user.

Also, after outputting the learning confirmation request message such as "do you want me to learn it?", when the short-answer user voice such as "yes" is input from the user with respect to the output learning confirmation request message, the electronic device 1000 may output the learning start guide message such as "let me start learning, tell me the operation." However, after outputting the learning confirmation request message such as "do you want me to learn it?", when the user voice such as "let's start learning" is obtained, the electronic device 1000 may output the learning start guide message such as "yes, let me start learning, please tell me the function first". The user's response to the inquiry of the voice assistant may be input as the user voice or may be input through user's touch on a graphical user interface (GUI) such as icons displayed on the electronic device 1000.

According to an embodiment, besides the voice input, when a trigger input set in advance is obtained through a user input interface of the electronic device 1000 or a remote controller connected to the electronic device 1000 through wires or wirelessly, the electronic device 1000 may output the learning start guide message such as "let me start learning, please tell me the function first."

According to an embodiment, when the trigger input set in advance is input from the user, the electronic device 1000 may wait for reception of input sequences from the user, without outputting the learning start guide message such as "yes, let me start learning, please tell me the function first".

When the trigger input set in advance is obtained, or when the user response such as "yes" or "let's start learning" is input after outputting the learning confirmation request message such as "do you want me to learn it?", the electronic device 1000 is switched into a learning mode for learning the response operation that was unable to be performed. According to an embodiment, the electronic device 1000 may be switched into the learning mode for learning the response operation with respect to the user voice, which has been determined not performable, with the outputting of the learning start guide message such as "let me start learning, tell me the function first".

For example, as the electronic device 1000 is switched into the learning mode, the electronic device 1000 may activate at least one of software (SW) models (e.g. ASR model, NLU model, AP model, NLG model, TTS model) for providing the voice assistant service. Also, with the activation of the models for providing the voice assistant service, the electronic device 1000 may activate a microphone module, a touch screen module, a user interface (UI) module, etc. that are necessary for receiving the user input for learning the voice assistant service.

According to an embodiment, the electronic device 1000 may determine the SW models for providing the voice assistant service and modules that are necessary for receiving the user input for learning the voice assistant service, based on a current operation state of the electronic device. For example, when the current operation state of the electronic device 1000 is a touch-lock state according to necessity of the user, the electronic device 1000 may only execute the microphone module from among the microphone module, the touch screen module, and the UI module required to receive the user input. According to an embodiment, when a video is being reproduced by the electronic device 1000, the electronic device 1000 may only execute the microphone module from among the microphone module, the touch screen module, and the UI module, in order to prevent the video reproduction from being terminated due to a user touch.

That is, the electronic device 1000 may only execute the SW modules that are necessary based on the current operation state of the electronic device to reduce SW resource cost caused by unnecessary execution of SW modules, and to provide optimal voice assistant service.

The electronic device 1000 may output the learning start guide message and may also activate in advance the model for providing assistant service that is determined to be necessary for learning the voice assistant service, the SW modules for supporting functions of the electronic device, which are necessary for receiving the user input, etc. so as not to delay the reception of the user input for learning the voice assistant service.

After outputting the learning start guide message, the electronic device 1000 may obtain user voices about at least one function of the electronic device, wherein the function may be executed by using the voice assistant service, from the user as input sequences. For example, the electronic device 1000 may obtain user voices such as "open the camera" and "open the AR emoji" as input sequences, after outputting the learning start guide message.

After outputting the learning start guide message, the electronic device 1000 may store the obtained user input sequences in a memory after classifying the input sequences according to functions of the electronic device 1000, and moreover, may record in the memory an input order of the user input sequences obtained after outputting the learning start guide message. Also, as described above, the electronic device 1000 may further store in the memory an order between the user input sequences and the series of guide messages such as "please tell me in more detail" output in response to the user input sequences.

After outputting the learning start guide message, the electronic device 1000 may learn the voice assistant service based on at least one of the obtained user input sequences, the input order of the user input sequences, or the order among the user input sequences and the series of guide messages. When the user voice such as "please open my emoticon" is obtained, the electronic device 1000 may determine that the response operation with respect to the user voice is performable by using the trained voice assistant service, and may execute a series of response operations (e.g., a camera application execution, an AR emoji execution, my emoticon execution) regarding the "please open my emoticon".

According to an embodiment, when the reception of the user input sequences for learning the voice assistant service is ended, the electronic device 1000 may output an instruction setting request message such as "yes, which instruction do you want to use?". After outputting the instruction setting request message, the electronic device 1000 may obtain the user voice such as "please open my emoticon" from the user, and may set the instruction corresponding to the obtained user voice as an instruction for calling the newly trained voice assistant service. When the user voice with respect to the instruction setting request message is obtained, the electronic device 1000 may output a learning completion guide message such as "Learning is finished."

According to an embodiment, when the input sequences such as "Learning ended" representing the end of the learning operation are obtained from the user, the electronic device 1000 finishes the learning of the voice assistant service and may output the instruction setting request message such as "Yes, which command do you want to use?" However, even when the input sequence representing the end of the learning operation is not obtained from the user, the electronic device 1000 may terminate the learning of the voice assistant service and output the command setting request message such as "Yes, which instruction do you want to use?", when the user voice such as "please open my emoticon" that the electronic device 1000 has determined that the response operation thereof is performable is input again.

According to an embodiment, when a preset end sequence representing the end of the learning operation is received through the remote control connected to the user input interface of the electronic device or the electronic device through wires or wirelessly, in addition to the voice input such as "end learning operation" representing the end of the learning operation, the electronic device 1000 may terminate the learning and output the instruction setting request message such as "yes, which instruction do you want to use?"

Before learning the voice assistant service, when the user voice such as "please open my emoticon" is obtained in a state in which the camera application is not executed, the electronic device 1000 determines that performing of the response operation with respect to the user voice is impossible and is unable to perform the response operation with respect to the obtained user voice. However, even in a state in which the camera application is not executed (e.g., home screen is displayed), the electronic device 1000 which learns the voice assistant service according to an embodiment may execute the camera application and select the AR emoji service provided by the camera application to execute the AR emoticon as a series of response operations with respect to the user voice such as "please open my emoticon", when the user voice "please open my emoticon" is obtained.

According to an embodiment, the electronic device 1000 may include a smartphone equipped with an AI program and including a voice recognition function, a tablet PC, a PC, a smart TV, a mobile phone, a personal digital assistant (PDA), a laptop computer, a media player, a server, a micro-server, a global positioning system (GPS) device, an E-book terminal, a digital broadcasting terminal, a navigation device, a kiosk, an MP3 player, a digital camera, a speaker, and other mobile or non-mobile computing devices, but is not limited thereto.

According to an embodiment, the electronic device 1000 may transfer user voice to a server 2000. The server 2000 may output a response operation with respect to the user voice transmitted from the electronic device 1000, by using the voice assistant service.

For example, the server 2000 may determine whether the response operation with respect to the received user voice is performable, and when it is determined that the response operation with respect to the user voice is performable, the server 2000 may transfer information related to the response operation with respect to the user voice to the electronic device 1000.

According to an embodiment, when it is determined that the response operation with respect to the user voice is not performable, the server 2000 may transfer information related to the determination that the response operation with respect to the user voice is not performable to the electronic device 1000.

When receiving the determination that the response operation with respect to the user voice is not performable from the server 2000, the electronic device 1000 outputs an error message such as "sorry, this service is not provided", and then, may output a series of guide messages for learning the response operation, wherein the series of guide messages includes the learning confirmation request message such as "do you want me to learn it?", the learning start guide message such as "let me start learning, please tell me the operation", the learning supplement message such as "please tell me in detail", and the instruction setting request message such as "yes, which command do you want to use?".

After outputting the learning start guide message, the electronic device 1000 may obtain user voices about at least one function of the electronic device, wherein the function may be executed by using the voice assistant service, from the user as input sequences, and may transfer the input sequences to the server 2000. Also, after outputting the learning start guide message, the electronic device 1000 may classify the user input sequences according to functions of the electronic device, and may further transfer the input sequences classified according to the functions of the electronic device and the input order of the input sequences to the server 2000. The server 2000 may learn the voice assistant service based on at least one of the obtained user input sequences, the input order of the user input sequences, or an order among the user input sequences and the series of guide messages.

With respect to the user voice transmitted from the electronic device 1000, the method, performed by the server 2000, of performing the series of response operations corresponding to the user voice by using the voice assistant service may correspond to the above-described method, performed by the electronic device 1000, of performing the response operations corresponding to the user voice by using the voice assistant service, and thus, detailed descriptions thereof are omitted.

According to an embodiment, the server 2000 may be another electronic device capable of communicating with the electronic device 1000. The server 2000 may include another computing device that is connected to another device connected to the electronic device via a network and may transmit/receive data. According to an embodiment, a network 3000 may include a local area network (LAN), a wide area network (WAN), a value added network (VAN), a mobile radio communication network, a satellite communication network, and a combination thereof. The network is, in a broad sense, a data network via which components of each network shown in FIG. 1B actively communicate with each other, and may include wired Internet, wireless Internet, and a mobile wireless communication network.

Figure 2:
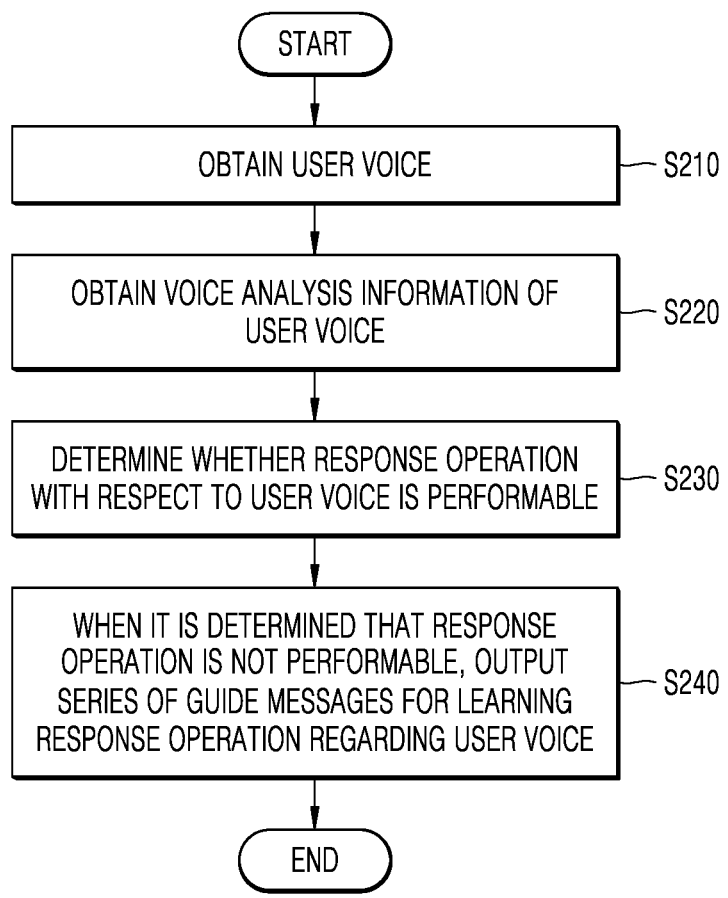
FIG. 2 is a flowchart of a method, performed by an electronic device, of providing a voice assistant service according to an embodiment.

FIG. 2 is a flowchart of a method, performed by the electronic device 1000, of providing a voice assistant service according to an embodiment.

In operation S210, the electronic device 1000 may obtain the voice from the user. For example, the electronic device 1000 may obtain the user voice via at least one microphone included in the electronic device 1000. According to an embodiment, the electronic device 1000 may obtain at least one of a voice input, a key input, a touch input, or a motion input from the user via a user input interface. Also, the electronic device 1000 may obtain the voice input of the user, which is received by a peripheral electronic device capable of communicating with the electronic device 1000. According to an embodiment, and input sequence may include at least one of the voice input, the key input, the touch input, or the motion input from the user.

In operation S220, the electronic device 1000 may obtain voice analysis information from the obtained user voice. For example, when a confidence score of a text obtained by converting the user voice by using the ASR model is equal to or less than a preset threshold value, the electronic device 1000 may determine that a response operation is not performable. However, when the confidence score of the text obtained by converting the user voice by using the ASR model is equal to or greater than the preset threshold value, the electronic device 1000 may obtain the voice analysis information that is necessary to determine the response operation from the text by using the NLU model. According to an embodiment, the voice analysis information may include at least one of intent information that is necessary for determining the response operation from the user voice, or slot information that is necessary for determining a parameter related to the response operation matching with the intent.

For example, the intent information obtained when the electronic device 1000 inputs the user voice into the NLU model may represent intention of the user who utters the natural language. Also, the slot information is necessary for providing the response operation (e.g., right answer) matching with the intention of the user's utterance and may be information for slot filling. According to an embodiment, the electronic device 1000 may request input of the slot information that is necessary for the response operation matching the intent information until the slot information is satisfied.

In operation S230, the electronic device 1000 may determine whether to perform the response operation with respect to the user voice. According to an embodiment, the electronic device 1000 may obtain the intent information, the slot information, and probability values of the intent information and the slot information, by analyzing the text corresponding to the user voice by using the NLU model. The electronic device 1000 may determine whether the response operation with respect to the user voice is performable, based on the probability values of the intent information and the slot information.

That is, the electronic device 1000 may determine that the response operation with respect to the user voice is not performable, when the confidence value of the text converted from the user voice via the ASR model is less than the preset threshold value. However, even when the confidence value of the text converted from the user voice is equal to or greater than the preset threshold value and when the probability value of the intent information or the probability value of the slot information obtained through the NLU model are equal to or less than the preset threshold value, the electronic device 1000 may determine that the response operation with respect to the user voice is not performable.

For example, the electronic device 1000 may obtain a text such as "please book a movie ticket" converted from the user voice and a confidence score of the text by using the ASR model. When the confidence score of the text such as "please book a movie ticket" is less than a preset threshold value, the electronic device 1000 may determine that the user voice is not recognizable, and as the user voice is determined not to be recognizable, the electronic device 1000 may also determine that the response operation for the user voice is not performable.

However, when the confidence score of the text such as "please book a movie ticket" is greater than the preset threshold value, the electronic device 1000 may determine the intent information or the slot information with respect to the text "please book a movie ticket" by using the NLU model, and when the probability value of the intent information or the slot information is less than a preset threshold value, the electronic device 1000 may determine that the response operation with respect to the user voice is not performable.

For example, the electronic device 1000 obtains the user voice such as "please book a movie ticket", and then may identify at least one piece of candidate intent information from the obtained user voice. The candidate intent information may include at least one candidate intent identified by the electronic device 1000 and a probability value between 0 and 1 with respect to each candidate intent. Here, the probability value denotes the likelihood that the obtained user voice corresponds to the identified candidate intent. The electronic device 1000 may determine the candidate intent (e.g., 'booking' or 'reservation') having the greatest probability value from among the at least one piece of candidate intent information as the intent information of the user voice such as "please book a movie ticket".

According to an embodiment, when the probability value of at least one piece of intent information identified from the user voice such as "please book a movie ticket" is less than the preset threshold value, the electronic device 1000 may determine that the intent information cannot be identified from the user voice such as "please book a movie ticket". According to an embodiment, when the probability values of all the intent information identified from the user voice such as "please book a movie ticket" are less than the preset threshold value, the electronic device 1000 may determine that the intent information cannot be identified from the user voice.

Also, the electronic device 1000 may obtain user voice such as "please open AR emoji" and may determine the intent information as 'execution' from the obtained user voice. However, the electronic device 1000 cannot determine slot information of the user voice. For example, the electronic device 1000 may identify a plurality of pieces of candidate slot information matching the 'execution', that is, the intent information of the user voice such as "please open AR emoji". The candidate slot information may include at least one candidate slot identified by the electronic device 1000 and a probability value between 0 and 1 with respect to each candidate slot. Here, the probability value denotes the likelihood that the obtained user voice corresponds to the identified candidate slot. The electronic device 1000 may determine, from among the at least one candidate slot (e.g., 'AR emoji', 'emoticon', 'image'), the candidate slot (e.g., 'AR emoji') having the highest probability value as the slot information of the user voice such as "please open AR emoji".

According to an embodiment, when the probability value of at least one piece of candidate slot information (e.g., 'AR emoji', 'emoticon', 'image') matching the 'execution', that is, the intent information of the user voice such as "please open AR emoji", is less than a preset threshold value, the electronic device 1000 may determine that the slot information cannot be identified from the user voice such as "please open AR emoji".

According to an embodiment, when the probability values of all the slot information identified from the user voice such as "please open AR emoji" are less than the preset threshold value, the electronic device 1000 may determine that the slot information cannot be identified from the user voice.

That is, when the probability value for the intent information or the probability value for the slot information obtained by using the NLU model is less than the preset threshold value, the electronic device 1000 may determine that the response operation with respect to the user voice is not performable. However, when the probability value for the intent information and the probability value for the slot information are greater than the preset threshold value, the electronic device 1000 may determine that the response operation with respect to the user voice is performable. On the contrary, when the probability value for the intent information and the probability value for the slot information are greater than the preset threshold value, the electronic device 1000 may identify a computer-readable instruction corresponding to the intent information and the slot information and may execute the identified computer-readable instruction.

According to an embodiment, when the probability value for the intent information and the probability value for the slot information are greater than the preset threshold value, the electronic device 1000 may determine whether the response operation with respect to the user voice is performable based on whether the computer-readable instruction corresponding to the identified intent information and the slot information is an instruction regarding the response operation that is performable by the electronic device in the current operation state of the electronic device. For example, when the computer-readable instruction corresponding to the intent information and the slot information of the user voice determined to be recognizable is an instruction regarding the response operation that is not performable in the current operation state of the electronic device, the electronic device 1000 may determine that the response operation with respect to the recognizable user voice is not performable.

That is, as described above with reference to FIGS. 1A and 1B, whether the electronic device 1000 is able to perform the response operation with respect to the user voice may vary depending on the current operation state of the electronic device. For example, the operation state of the electronic device may vary depending on a screen currently displayed on a display, a kind of an application that is being executed on the electronic device, a kind of service selectable in the application that is being executed, an update state of the application that is being executed, etc.

According to an embodiment, the electronic device 1000 may determine that the response operation with respect to the user voice that is recognizable is not performable when the electronic device is in a locked state. In addition, according to an embodiment, when the computer-readable instruction corresponding to the intent information and the slot information obtained from the user voice that is recognizable or the application executed by the computer-readable instruction is not stored in the memory of the current electronic device, the electronic device 1000 may determine that the response operation with respect to the user voice is not performable.

Also, when the application executed by the computer-readable instruction corresponding to the intent information and the slot information obtained from the user voice is not updated to the latest version, the electronic device 1000 may determine that the response operation with respect to the user voice is not performable.

According to an embodiment, the electronic device 1000 may generate a virtual electronic device screen, and may determine the current operation state of the electronic device 1000 by using a rendering model that records the user input through the virtual electronic device screen or a virtual user input interface of the electronic device. A criterion for determining whether the electronic device 1000 is able to perform the response operation with respect to the user voice is not limited to the examples in the detailed description with reference to FIGS. 1A to 2, but may vary depending on convenience of the voice assistant service provider.

In operation S240, when it is determined that the response operation is not performable, the electronic device 1000 may output a series of guide messages for learning the response operation related to the user voice. According to an embodiment, when it is determined that the response operation with respect to the user voice is not performable, the electronic device 1000 may output the error message such as "sorry, this service is not provided" and a guide message such as "do you want me to learn it?", or may sequentially output a series of guide messages for learning the response operation after outputting the error message.

Also, when it is determined that the response operation with respect to the user voice is not performable, the electronic device 1000 may output a learning confirmation request message such as "do you want me to learn it?", and then, when a short-answer response such as "yes" or "let's start learning" is input from the user, the electronic device 1000 may be switched to a learning mode for learning the response operation that was unable to be performed.

A method of executing the touch screen module, the UI module, the microphone module, etc. that are necessary to receive the user input for learning the voice assistant service in the learning mode by the electronic device 1000 is the same as the above description with reference to FIGS. 1A and 1B, and thus, detailed descriptions thereof are omitted.

According to an embodiment, after the electronic device 1000 outputs the error message, the series of guide messages for learning the response operation may include, but is not limited to, a learning confirmation request message such as "do you want me to learn it?", a learning start guide message such as "let me start learning, please tell me the operation", a learning supplement message such as "please tell me in detail.", an instruction setting request message such as "yes, which command do you want to use?", and other messages which are required to learn the response operation with respect to the user voice by interacting with the user.

At least a part of the method, performed by the electronic device 1000, of providing the voice assistant service as shown in FIG. 2 may be performed by the electronic device 1000 or the server 2000, or by both the electronic device 1000 and the server 2000.

For example, the electronic device 1000 may obtain the user voice and transfer the obtained user voice to the server 2000. The server 2000 may convert the user voice into a text by using the ASR model, and may determine whether the response operation with respect to the user voice is performable based on the probability value of the intent information or the slot information obtained from the converted text by using the NLU model. The method, performed by the server 2000, of determining whether the response operation with respect to the user voice is performable may correspond to the detailed method, by the electronic device 1000, of determining whether the response operation with respect to the user voice is performable. When it is determined that the response operation with respect to the user voice is performable, the server 2000 may transfer information related to the response operation with respect to the user voice to the electronic device 1000.

However, when it is determined that the response operation with respect to the user voice is not performable, the server 2000 may transfer information related to the determination that the response operation with respect to the user voice is not performable to the electronic device 1000. According to an embodiment, the server 2000 may request the electronic device to transfer the input sequence of the user for learning the response operation with respect to the user voice, together with the error message such as "sorry, this service is not provided" or the learning confirmation request message "do you want me to learn it?".

The server 2000 may obtain the user voices regarding at least one function of the electronic device as input sequences from the electronic device 1000. According to an embodiment, in addition to the user input sequences, the server 2000 may receive information about an order of the user input sequences, and an order among the series of guide messages provided by the electronic device 1000 and the user input sequences.

Figure 3:
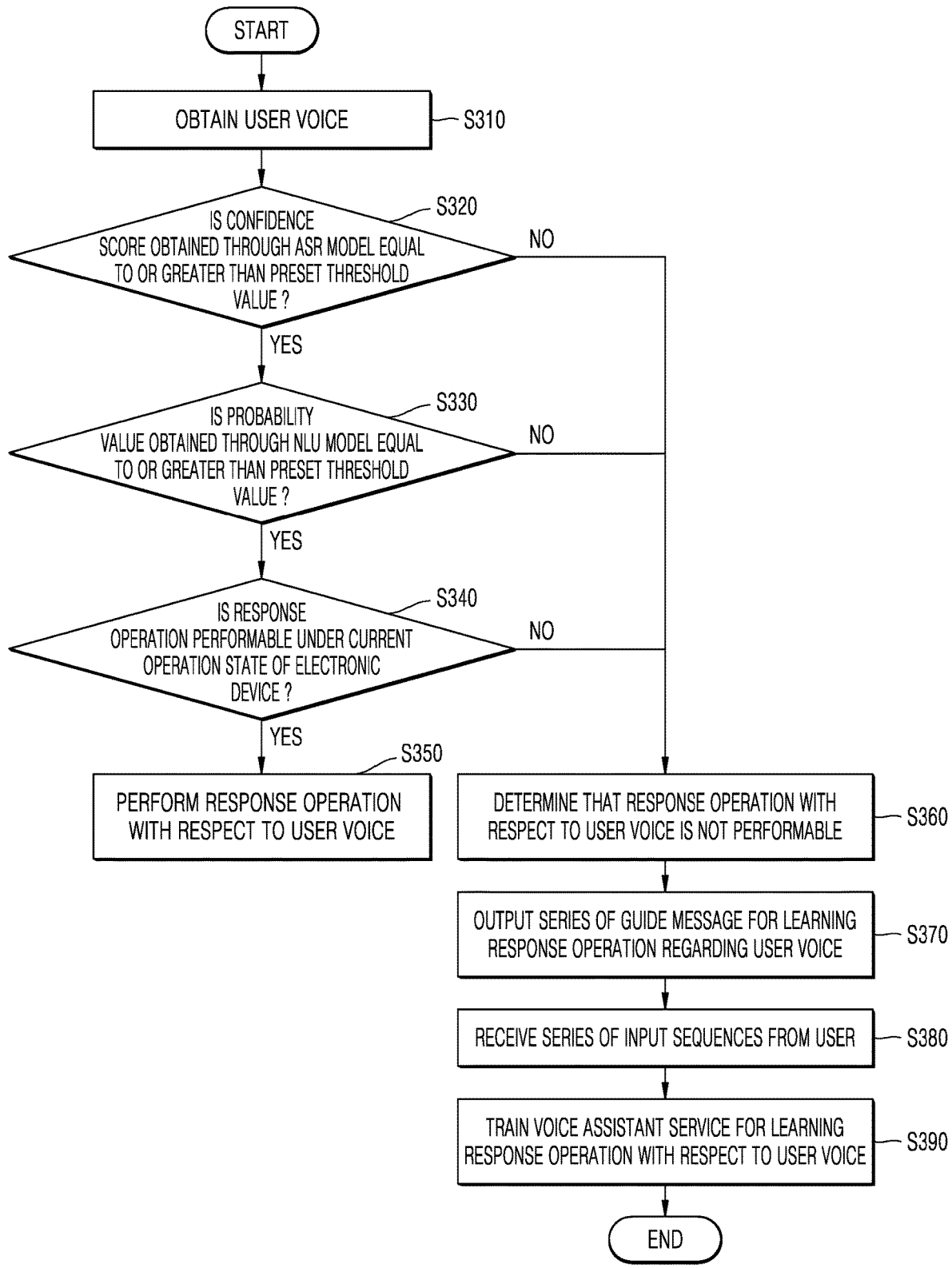
FIG. 3 is a flowchart of a method, performed by an electronic device, of providing a voice assistant service according to an embodiment.

FIG. 3 is a flowchart of a method, performed by the electronic device 1000, of providing a voice assistant service according to an embodiment.

In operation S310, the electronic device 1000 may obtain the voice from the user. Because operation S310 may correspond to operation S210 of FIG. 2, detailed descriptions thereof are omitted. In operation S320, the electronic device 1000 may obtain a probability value of a text converted from the user voice by using the ASR model, and may determine whether the obtained probability value is equal to or greater than a preset threshold value.

In operation S330, when the probability value of the text converted from the user voice by using the ASR model is equal to or greater than the preset threshold value, the electronic device 1000 may determine whether the probability value for the intent information or the probability value for the slot information is equal to or greater than a preset threshold value via the NLU model. Operation S320 and operation S330 may correspond to operation S220 of FIG. 2, and thus, detailed descriptions thereof are omitted.

In operation S340, when the probability value for the intent information and the probability value for the slot information are equal to or greater than the preset threshold value, the electronic device 1000 may determine whether the computer-readable instruction corresponding to the intent information and the slot information obtained through the NLU model may be executed in the current operation state of the electronic device.

In operation S350, when the computer-readable instruction corresponding to the intent information and the slot information is determined to be the instruction about the response operation that is performable in the current operation state of the electronic device in operation S340, the electronic device 1000 may perform the response operation with respect to the user voice.

However, in operation S360, when a confidence score of the text converted from the user voice through the ASR model is less than a preset threshold value, when the probability value for the intent information or the slot information obtained through the NLU model is less than the preset threshold value, or when the computer-readable instruction corresponding to the identified intent information and the slot information is not the instruction about the response operation that is performable in the current operation state of the electronic device, the electronic device 1000 may determine that the response operation with respect to the user voice is impossible to be performed.

In operation S370, when it is determined that the response operation is not performable, the electronic device 1000 may output a series of guide messages for learning the response operation with respect to the user voice. For example, after the electronic device 1000 outputs the error message, the series of guide messages for learning the response operation may include a learning confirmation request message such as "do you want me to learn it?", a learning start guide message such as "let me start learning, please tell me the operation", a learning supplement message such as "please tell me in detail.", an instruction setting request message such as "yes, which command do you want to use?", and the electronic device 1000 may output a series of messages that are necessary under the current circumstance by analyzing the output guide messages and the relationship of the user input sequence with respect to each of the output guide messages.

According to an embodiment, the electronic device 1000 may determine context information by analyzing contextual meaning represented by the currently output guide messages and the relationship of the user input sequences with respect to the output guide messages, based on the current operation state of the electronic device, and then, may output other guide messages that are necessary for the current user input sequence by using the context information.

In operation S380, the electronic device 1000 may receive input sequences from the user. For example, the electronic device 1000 may receive the input sequence that is input by the user according to the output guide message. The input sequence received by the electronic device 1000 may include at least one of a user voice input, a key input for manipulating the electronic device 1000, a touch input, or a motion input.

In operation S390, the electronic device 1000 may learn the voice assistant service by using the user input sequences input by the user. According to an embodiment, the electronic device 1000 may provide a voice assistant service by using a service model for providing the voice assistant service.

The service model for providing the voice assistant service may include an AI algorithm that is trained by using at least one of machine learning, neural network, genes, deep learning, or classification algorithm. Also, according to an embodiment, the voice assistant service model may include an ASR model, an NLU model, a DM model, an AP model, an NLG model, and a TTS model, which will be described in detail later with reference to operation S450 of FIG. 4.

The electronic device 1000 may store the obtained user input sequences in the memory according to functions of the electronic device, and moreover, may record an input order of the user input sequences that are obtained after outputting the learning start guide message.

The electronic device 1000 may further store the order among the user input sequences and the series of guide messages such as "please tell me in more detail", which are output in response to the user input sequences, in the memory, and may learn the voice assistant service model based on at least one of the user input sequences obtained from the user, the input order of the user input sequences, or the order among the user input sequences and the series of guide messages.

The electronic device 1000 may determine whether a newly received user voice is recognizable, may determine whether a response operation with respect to the user input is performable when it is determined that the user voice is recognizable, and may perform the response operation with respect to the newly received user voice when it is determined that the response operation with respect to the user input is performable, by using the voice assistant service model trained based on at least one of the user input sequences obtained from the user, the input order of the user input sequences, or the order among the user input sequences and the series of guide messages.

Figure 4:
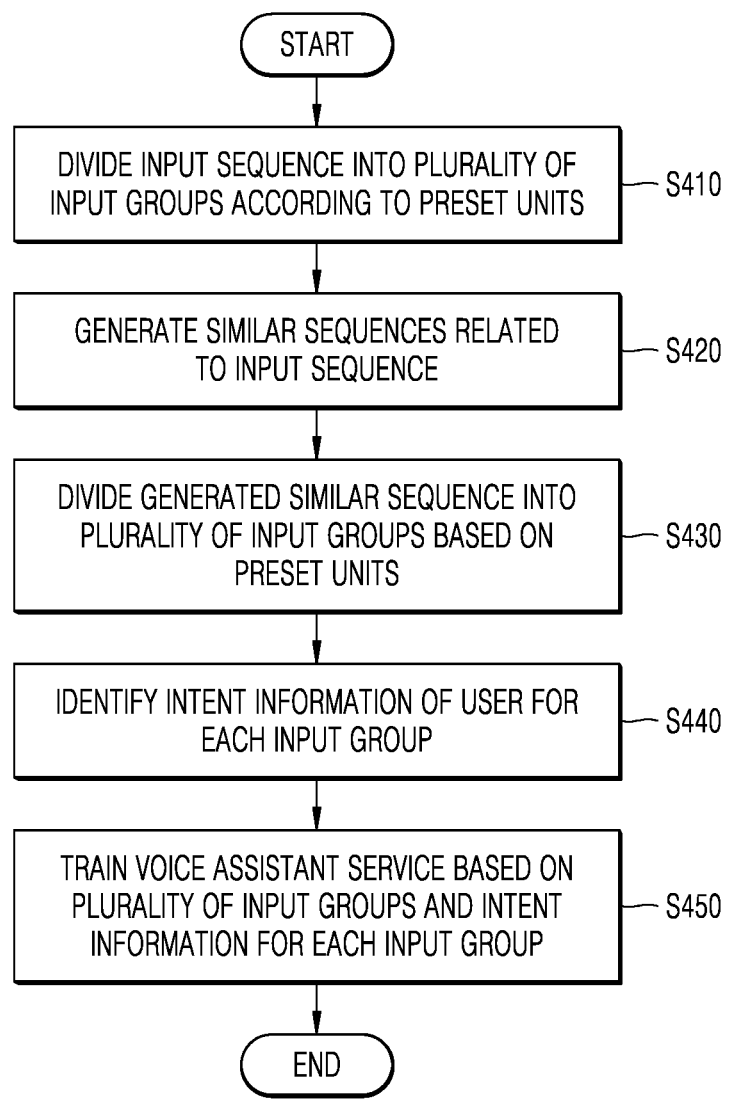
FIG. 4 is a diagram illustrating processes, performed by an electronic device, of learning a voice assistant service, according to an embodiment.

FIG. 4 is a diagram illustrating processes of learning a voice assistant service, according to an embodiment.

In operation S410, the electronic device 1000 may divide a user input sequence input by the user into a plurality of inputs according to units set in advance. The input sequence of the user may be divided based on the user input. For example, the input sequence received by the electronic device from the user may include a plurality of input groups received according to time, and each input group may include at least one input. For example, when the input sequence is obtained through four times of inputs from the user, the input sequence may be divided into four inputs. The input sequence for executing the emoticon may be divided into four inputs, e.g., 'execute a message application', 'select a new message input function', 'select a text input region', and 'select an emoticon icon'.

For example, when the partitioned input sequence is input, the electronic device 1000 classifies the input sequence into a plurality of input groups according to intent information. The electronic device 1000 groups the divided input sequence as the plurality of input groups by using an inference model. The inference model is trained based on the plurality of input groups and intent information for each of the input groups. That is, the electronic device 1000 may classify the plurality of inputs that are partitioned in operation S410, into a plurality of input groups based on the intent information by using the inference model.

According to an embodiment, the inference model may calculate an inference weight about an appropriate degree of inference with respect to each input group by using a Bausian network or first order logic (FOL), and may update the current inference weight according to the calculated inference weight. When receiving the input sequence including the plurality of inputs, the inference model calculates the inference weight after classifying the input sequence into arbitrary groups. The inference model repeatedly performs the classification into the arbitrary groups and calculation of the inference weight, with respect to each of the groups. When the inference weight of an arbitrary group is equal to or greater than a pre-set reference value, the inference model outputs the group in the input sequence at that time point as an input group. The inference model may include both a model trained by the input sequence partitioned into the plurality of inputs and the plurality of input groups for each sequence, and a model trained by using intent information for each input group. The inference model may be obtained by combining two models or may include one model.

The electronic device 1000 may classify four inputs into two groups by using the inference model. Also, the electronic device 1000 may output intent information corresponding to each group. For example, 'execute a message application' and 'select a function of inputting a new message' are a series of inputs regarding the intent information, e.g., 'execute message input', and may be classified as a first group. 'Select text input region' and 'select emoticon icon' are a series of inputs regarding the intent information, e.g., 'execute emoticon function', and may be classified as a second group.

According to an embodiment, when receiving a series of user input sequences from the user, the user input sequences including opening of a home screen (e.g., a first screen after unlock), opening of a gallery application for storing and managing pictures or videos, touching of a search bar provided by the gallery application for a searching service in a state in which the gallery application is executed, and inputting of a search word 'smiling face' in the search bar, the electronic device 1000 may partition the input sequences into a plurality of input groups in units of intent.

For example, the electronic device 1000 may determine 'open home screen' and 'execute gallery application' as a first input group including a series of inputs regarding the intent information, e.g., 'execute application', may determine 'execute gallery application' and 'touch input into search bar' as a second input group regarding the intent information, e.g., 'searching gallery', and may determine 'touch input into search bar' and 'a series of touch input for inputting search word smiling face' as a third input group regarding the intent information, e.g., 'searching for picture'.

That is, the electronic device 1000 may partition the series of user input sequences into a plurality of inputs, may group the plurality of inputs into certain input groups, and may identify intent information of the user for each input group.

In operation S420, the electronic device 1000 may generate similar sequences related to the input sequence. For example, when a certain input sequence is input, the electronic device 1000 may generate similar sequences that are similar to the input sequence input by the user by using a similar sequence generation model outputting the similar sequences to the input sequence.

According to an embodiment, the similar sequences generated by the electronic device 1000 are sequences that correspond to the same intent information as that of the input sequence but perform different operation, and may include a similar voice input, a similar key input, a similar touch input, or a similar motion input that are respectively similar to the voice input, the key input, the touch input, and the motion input from the user.

For example, the similar sequence generation model may generate the similar sequences based on the input group including at least one user input and the user intent information for each input group obtained through the inference model. For example, the similar sequence generation model may receive, from the inference model, the intent information, e.g., 'execute message input', and the input group related to the intent information, that is, the sequence related to the 'execute message application' (e.g., including a plurality of user inputs, that is, select home screen and select message application).

The similar sequence generation model is trained only based on the sequences related to the 'execute message application' with respect to the intent information such as 'execute message input', and thus, may only generate the sequences related to the 'execute message application', including 'select home screen' and 'select and input message application' as the sequences related to the intent information such as 'execute message input'.

However, the similar sequence generation model may receive, from the inference model, the intent information, e.g., 'execute message input', and a new sequence related to the intent information, e.g., 'select new message input function', as one input group (e.g., including a plurality of inputs such as select message application and select new message menu), and is trained based on the received intent information such as 'execute message input' and the new input group related to the intent information, e.g., 'select new message input function'. In addition, when the input sequence related to the 'execute message application' is received from the user, the similar sequence generation model may generate 'select new message input function' that has the same intent information but is a different sequence, as the similar sequence.

That is, the electronic device 1000 may train the similar sequence generation model based on the user input group output from the inference model and the intent information of the user for each input group. The electronic device 1000 may train the voice assistant service by using the input sequence received from the user and the similar sequence that is generated by the similar sequence generation model as training data, and may provide an optimal response operation with respect to the user voice.

In operation S430, the electronic device 1000 divides the similar sequence that is generated by using the similar sequence generation model and related to the user input sequence input from the user, into a plurality of groups by the method illustrated in operation S410. According to an embodiment, the electronic device may transfer the similar sequence generated by the similar sequence generation model to the inference model. The electronic device 1000 may partition the similar sequences into the plurality of input groups by using the inference model, in a similar way to that of operation S410.

In operation S440, the electronic device 1000 identifies the intent information of the user for each input group. For example, the electronic device 1000 may identify the intent information for each of the input groups of the input sequence input from the user or the input groups of the similar sequence by using the inference model.

In operation S450, the electronic device 1000 may learn the voice assistant service based on the plurality of input groups included in at least one of the input sequence or the similar sequence, and the intent information for each input group.

Processes of providing the voice assistant service by the electronic device 1000 by using the input sequence and the similar sequence related to the input sequence will be described below in detail. For example, a series of sequences for executing a gallery application for storing and managing pictures or videos, selecting one of the pictures provided by the gallery application in a state in which the gallery application is being executed, and sequentially selecting a share menu for sharing the selected picture and a message application are input by the user.

The electronic device 1000 may generate similar sequences to the series of sequences input by the user, the similar sequences including executing the message application, selecting a new message input menu, and sequentially selecting a picture attach menu and the gallery application in a state in which the new message input function is being executed. The similar sequences generated by the electronic device 1000 correspond to the intention of 'transferring a picture via message', but are different from the input sequences input by the user.

That is, the electronic device 1000 according to an embodiment learns the voice assistant service by further using the similar sequences in addition to the series of user input sequences, and thus, may perform the response operation corresponding to a voice input with the optimal sequences according to a status of the electronic device 1000 at the time of receiving the voice input from the user. For example, when a voice input from the user is input in a state in which the electronic device 1000 executes the gallery application, the response operation is performed in the sequences of sequentially selecting the share menu in the gallery application and the message application. Also, when the voice input from the user is input in a state in which the electronic device 1000 executes the message application, the response operation is performed in the sequences of sequentially selecting the picture attach menu in the message application and the gallery application.

Also, the electronic device 1000 trains the NLU model in the voice assistant service model by using the intent corresponding to each of the plurality of input groups and the text information corresponding to the user voice. For example, the electronic device 1000 may determine that the response operation with respect to the user voice such as 'show me pictures with smiling face' is not possible to be performed, and then, may train the NLU model by receiving the series of user input sequences including execution of the home screen, execution of the gallery application, touching of a navigation bar provided by the gallery application for providing a searching service in a state in which the gallery application is being executed, and inputting a search word 'smiling face' in the navigation bar, for learning the response operation with respect to the user voice.

In detail, the electronic device 1000 partitions the series of user input sequences into a first input group including 'execute home screen' and 'execute gallery application' and a second input group including 'execute gallery application' and 'touch search bar', and then, trains the NLU model based on the intent information, e.g., 'execute application' and 'search gallery', of the first input group and the second input group. Then, when the text corresponding to the user voice such as 'show me pictures with smiling face' is input from the user, the NLU model in the voice assistant service model may output the intent information such as 'execute application' and 'search gallery' and slot information such as 'gallery' and 'smiling face'.

In a related art NLU model unlike the NLU model in the voice assistant service model according to an embodiment, when the text corresponding to the user voice such as 'show me pictures taken in Suwon' is input in a state in which the NLU model is trained based on the text corresponding to the user voice such as 'show me pictures with smiling face', the NLU model may identify the intent information such as 'execute application' and 'search gallery' and the slot information such as 'gallery', but may not identify the slot information such as 'Suwon'.

However, according to the NLU model in the voice assistant service model according to an embodiment, even when the text corresponding to the user voice such as 'show me pictures taken in Suwon' that is different from the text corresponding to the user voice such as 'show me pictures with smiling face' is received, the NLU model may determine that the text such as 'show me pictures taken in Suwon' also includes the same intent information, based on the plurality of input groups included in the series of user input sequences and the user intent information for each group, wherein the series of user input sequences have been received to learn the response operation with respect to the user voice such as 'show me pictures with smiling face'.

Therefore, when the text ('show me pictures taken in Suwon') corresponding to the user voice, the text of which ('show me pictures with smiling face') is different but has the same intent information, is received, the NLU model according to an embodiment may determine the slot information of 'show me pictures taken in Suwon' as 'Suwon', based on the slot information 'smiling face' of the text 'show me pictures with smiling face' that has the same intent information and was received before.

In an embodiment, the electronic device 1000 may respectively receive the user voice and the text corresponding to the user voice and train the ASR model in the voice assistant service model.

For example, when receiving a user voice signal, the ASR model compared an acoustic pattern of the voice signal with reference acoustic patterns (in units of phonemes) to output a text corresponding to the most similar pattern from among the reference acoustic patterns. Here, the plurality of reference acoustic patterns that the ASR model learns represent a plurality of candidate texts, and the ASR model converts the user voice based on a candidate text showing the most similar acoustic pattern to the acoustic pattern of the obtained user voice, from among the plurality of candidate texts.

The electronic device 1000 according to an embodiment may learn the plurality of reference patterns representing the acoustic pattern of the user voice based on the user voice and the text information corresponding to the user voice, and then may improve the accuracy of voice recognition.

For example, the electronic device 1000 may determine that the response operation with respect to the user voice such as 'show me pictures with smiling face' is not possible be performed, and then, may receive a series of user input sequences for learning the response operation with respect to the user voice. Here, the electronic device 1000 may divide the user voice 'show me pictures with smiling face', a response operation of which is determined to be impossible, in units of phonemes, and then may determine a voice recognition score by comparing a vector defining the divided acoustic pattern for each phoneme unit with a vector for each phoneme unit forming the reference acoustic pattern stored in an ASR database in advance. The voice recognition score may denote a probability value that the acoustic pattern of the user voice will correspond to the reference acoustic pattern.

When the voice recognition score obtained by comparing the vector for each phoneme unit in the user voice such as 'show me pictures with smiling face' with the vectors of the phoneme units in the reference acoustic pattern stored in the ASR database in advance is equal to or less than a threshold score, the electronic device 1000 may add the vector for each phoneme unit in the user voice such as 'show me pictures with smiling face' to the ASR database and may re-adjust ranking of the reference acoustic patterns stored in the ASR database. The ranking of the reference acoustic patterns may be determined based on a similarity degree between the vector for each phoneme unit in the user voice and the vector for each phoneme unit in the reference acoustic pattern, and the similarity degree may vary depending on a pitch, energy, duration time, etc. of the each phoneme.

Also, the electronic device 1000 may train the NLG model in the voice assistant service model by using some of the text information corresponding to the user voice. For example, a word indicating a function may be selected from the text information corresponding to the user voice, and then the selected word may be added to the NLG model. When the text information corresponding to the user voice includes 'please select a picture and send it via a message', 'select picture and send it via message' may be selected and registered in the NLG model. Then, the NLG model may output a response message, that is, 'the picture is selected and transferred via a message', by using the text information that is already registered and the newly registered text information.

Also, the electronic device 1000 may train the DM model based on input groups in a series of user input sequences that are received for training the response operation with respect to the user voice, and intent information or slot information for each input group.

For example, the electronic device 1000 may determine that the response operation with respect to the user voice such as 'show me pictures with smiling face' is not possible to be performed, and then, may receive a series of user input sequences, in order to learn the response operation with respect to the user voice, for example, the series of user inputs including execution of the home screen, execution of the gallery application, touching of a navigation bar provided by the gallery application for providing a searching service in a state in which the gallery application is being executed, and inputting a search word 'smiling face' in the navigation bar.

The electronic device 1000 trains the DM model by matching the intent information for each input group in the user input sequences that have been received during the learning process of the response operation with respect to the user voice, with the slot information corresponding to the intent information.

For example, the electronic device 1000 may generate a first dialogue path by matching intent information 'execute application' of the first input group (e.g., 'execute home screen' and 'execute gallery application') in the user input sequences that have been received during the process of learning the response operation with respect to the user voice such as 'show me pictures with smiling face' with the slot information 'gallery' of the first input group, may generate a second dialogue path by matching the intent information 'search gallery' of the second input group (e.g., 'execute gallery application' and 'touch and input navigation bar') with the slot information 'navigation bar' of the second input group, and may determine a third dialogue path by matching the intent information 'search gallery' of the third input group (e.g., 'touch navigation bar' and 'input search word 'smiling face'') in the user input sequences with the slot information 'smiling face' of the third input group.

The electronic device 1000 may generate a dialogue management map by using a plurality of dialogue paths that are generated by matching the intent information for each input group with the slot information corresponding to the intent information in the user input sequences, and may train the DM model by modifying and refining the generated dialogue management map.

For example, when a text such as 'show me a face picture' is received, the DM model that is trained based on the user input sequences received during processes of learning the response operation with respect to the user voice such as 'show me pictures with smiling face' may determine the intent information regarding 'show me a face picture' as 'execute application', 'search gallery', and 'touch search bar' through the NLU model, so that the electronic device may output a response operation such as 'do you want to see pictures with smiling face?' based on the slot information of the third dialogue path related to 'touch search bar' that is the last identified intent information from among the series of user input sequences received during the process of learning the response operation with respect to the user voice such as 'show me pictures with smiling face'.

That is, the DM model is trained based on the input groups in the user input sequence, and the intent information and slot information for each of the input groups, and thus, a dialogue path including the intent information or slot information in the newly received user input sequence may be identified and a natural response operation with respect to the user voice may be provided according to the identified dialogue path.

Also, the electronic device 1000 trains the AP model in the voice assistant service model by using the plurality of input groups and intent information.

For example, the electronic device 1000 may determine that the response operation with respect to the user voice such as 'show me pictures with smiling face' is not possible to be performed, and then, may receive a series of user input sequences, in order to learn the response operation with respect to the user voice, for example, the series of user inputs including execution of the home screen, execution of the gallery application, touching of a search bar provided by the gallery application for providing a searching service in a state in which the gallery application is being executed, and inputting a search word 'smiling face' in the search bar.

The electronic device 1000 trains the AP model for determining an order of operations of the voice assistant service model, based on the input order of the input groups identified by the intent information in the user input sequence that is received during the process of learning the response operation with respect to the user voice such as 'show me pictures with smiling face'.

For example, the electronic device 1000 sequentially receives, as the user input sequence received during the process of learning the response operation with respect to the user voice, a first input group indicating intent information of 'execute application' (e.g., 'execute home screen' and 'execute gallery application'), a second input group indicating intent information of 'execute gallery application' (e.g., 'execute gallery application' and 'touch search bar' input), and a third input group indicating intent information of 'search gallery' (e.g., 'touch search bar' and 'input search word 'smiling face''), and may train the AP model based on the input groups, the intent information for each input group, and an order of the input groups identified in units of intent information. Also, the electronic device 1000 may train the AP model based on an operation state of the electronic device when the input groups in the user input sequence are received.

The electronic device 1000 performs the response operation with respect to the user voice according to an order of response operations with respect to the user voice, wherein the order is determined by using the trained AP model. For example, the electronic device 1000 that has learned the response operation with respect to the user voice such as 'show me pictures with smiling face' identifies intent information of the text, e.g., 'execute application', 'execute gallery application', and 'search gallery', corresponding to the user voice such as 'show me pictures with smiling face' in a state in which the home screen is currently displayed, and then, may generate response operations such as 'do you want to open gallery application?' and 'do you want to input search word 'smiling face'?' based on the dialogue path represented by the intent information identified by using the DM model.

Because the current operation state of the electronic device 1000 displays the home screen, the electronic device 1000 may output 'do you want to open gallery application?' as a response operation with respect to the user voice such as 'show me pictures with smiling face', from among the response operations such as 'do you want to open gallery application?' and 'do you want to input search word 'smiling face'?. That is, the electronic device 1000 trains the AP model based on the plurality of input groups in the user input sequence and the user's intention for each of the input groups, in order to manage the order of the series of response operations with respect to the user voice input from the user.

According to an embodiment, the electronic device 1000 may train the TTS model based on the user voice and the text information corresponding to the user voice. The TTS model may output a user voice signal corresponding to a reference acoustic pattern, from among the reference acoustic patterns, which is most similar to the acoustic pattern of the text generated by the electronic device as the response operation with respect to the user voice by comparing the acoustic pattern of the text generated by the electronic device with the reference acoustic patterns in a TTS database.

For example, the TTS model divides a text converted from the user voice such as 'show me pictures taken in Suwon' into word units, and divides each of the word units into phoneme units. The TTS model may determine a text recognition score by comparing a vector defining an acoustic pattern of each phoneme unit with a vector of each phoneme unit included in the reference acoustic pattern stored in the TTS database in advance. The text recognition score may indicate a probability value that the acoustic pattern of the text generated as the response operation would correspond to the reference acoustic pattern.

When the text recognition score is equal to or less than a threshold score set in advance, wherein the text recognition score is obtained by comparing the vector for each phoneme unit in the text such as 'show me pictures taken in Suwon' generated as a response operation with the vectors of phoneme units in the reference acoustic pattern in the TTS database, the electronic device 1000 may re-adjust ranking of the reference acoustic patterns stored in the TTS database in advance, by adding the vector for each phoneme unit in the text such as 'show me pictures taken in Suwon' to the TTS database. The ranking of the reference acoustic patterns may indicate a similarity degree between the vector for each phoneme unit in the text generated as the response operation and the vector for each phoneme unit in the reference acoustic pattern, and the similarity degree may vary depending on a pitch, energy, duration time, etc. of the each phoneme.

The TTS model identifies the reference acoustic pattern that is most similar to the acoustic pattern of the text such as 'show me pictures taken in Suwon' that is newly generated as the response operation by using the reference acoustic patterns in the TTS database, in which the ranking of the reference acoustic patterns is re-adjusted, and may output the user voice signal.

Figure 5A:
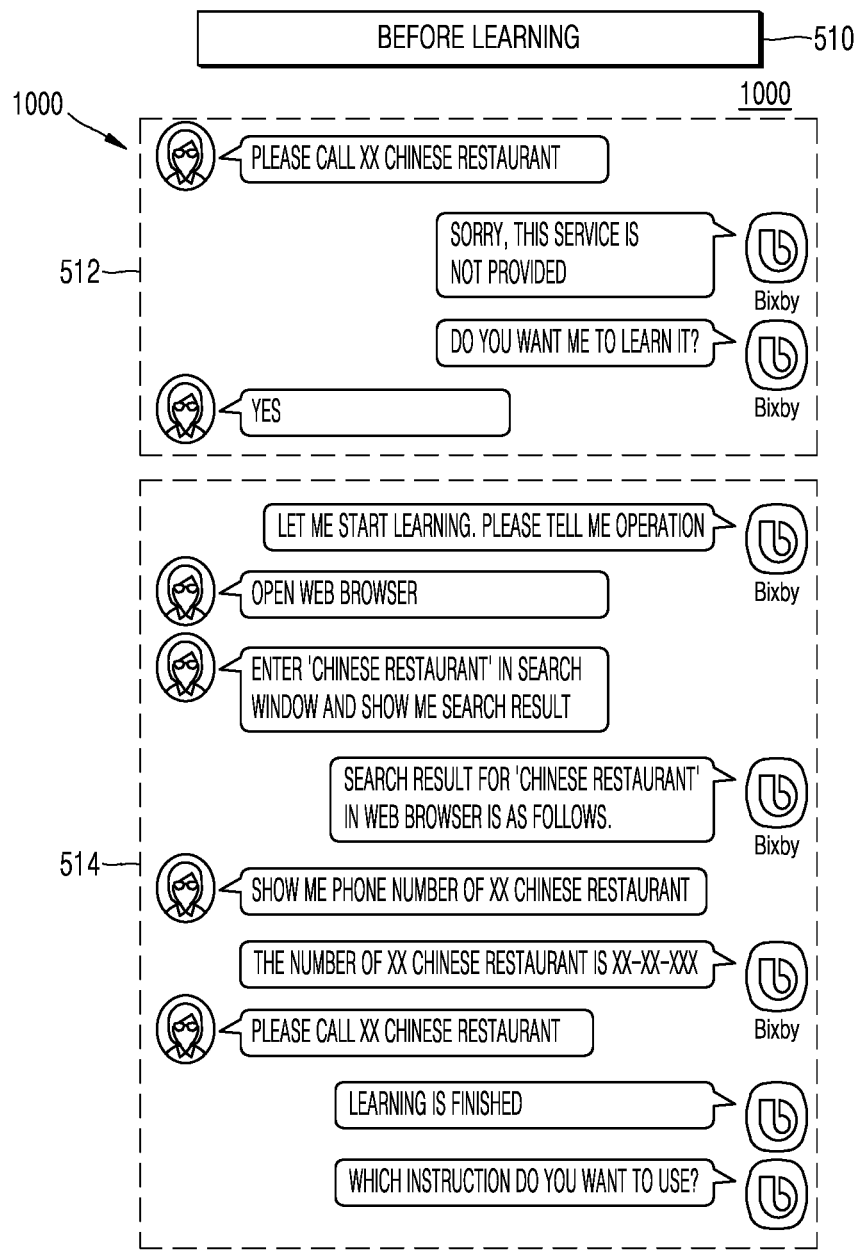
FIGS. 5A and 5B are diagrams illustrating processes, performed by an electronic device, of learning a voice assistant service, according to an embodiment.
Figure 5B:
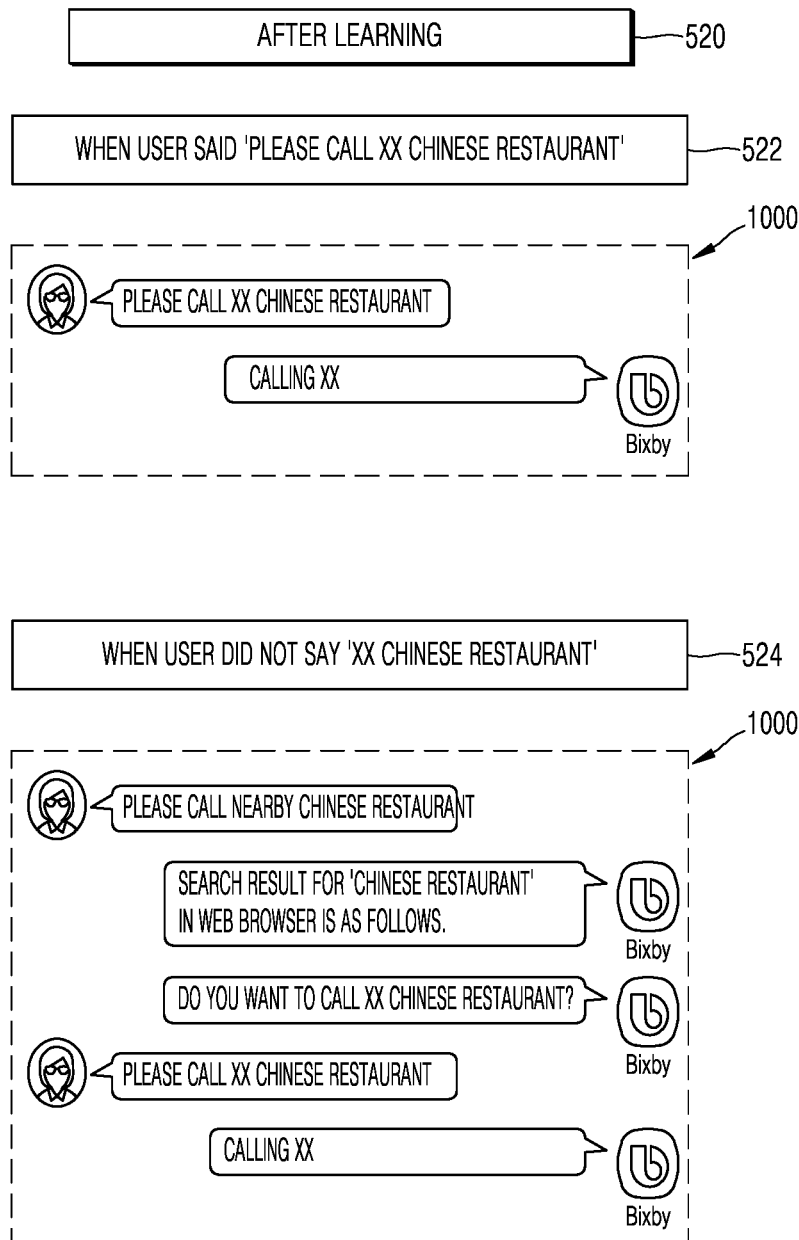

FIGS. 5A and 5B are diagrams illustrating processes, performed by the electronic device 1000, of learning a voice assistant service, according to an embodiment.

Operations of the electronic device 1000 will be described below, before the voice assistant service model of the electronic device 1000 learns a response operation with respect to a user voice such as "please call xx Chinese restaurant" (510). Referring to a box 512 in which an example of dialogue between the electronic device 1000 and the user is shown, the electronic device 1000 may obtain user voice such as "please call xx Chinese restaurant" from the user. The electronic device 1000 may convert the obtained user voice into a text by using the ASR model and may determine intent information of the converted text as 'calling' by using the NLU model, but might not recognize slot information such as 'xx Chinese restaurant'.

According to an embodiment, although the electronic device 1000 recognizes the intent information and the slot information, a phone number of xx Chinese restaurant is not stored in the memory of the electronic device 1000, and thus, the electronic device 1000 may determine that the response operation with respect to the user voice such as "please call xx Chinese restaurant" is not performable and may output an error message such as "sorry, this service is not provided".

Also, when a computer-readable instruction corresponding to the intent information and the slot information determined from the user voice such as "please call xx Chinese restaurant" is not about the operation that is performable in the current operation state (e.g., a game application is being executed) of the electronic device, the electronic device 1000 may determine that the response operation with respect to the user voice is not performable. When it is determined that the response operation with respect to the user voice is not performable, the electronic device 1000 may output an error message such as "sorry, this service is not provided", and may output a learning confirmation request message such as "do you want me to learn it?".

According to an embodiment, after outputting the training confirmation message, when a short-answer user voice such as "yes" is input from the user with respect to the output training confirmation message, the electronic device 1000 may output the learning start guide message such as "let me start learning, tell me the operation", and may activate a microphone module, a touch screen module, a UI module, etc. that are necessary for receiving the user input for learning the voice assistant service. According to an embodiment, when a trigger voice input such as "let's start learning" is input from the user, the electronic device 1000 may output the learning start guide message, and after that, may wait for the reception of user input sequence for learning a series of response operations.

Referring to a dialogue box 514, in which an example of dialogue between the electronic device 1000 and the user is shown, according to the learning start guide message such as "let me start learning, please tell me the operations", the electronic device 1000 may receive a series of input sequences for learning the response operation from the user. For example, the electronic device 1000 may obtain user voices such as "open web browser", "enter 'Chinese restaurant' in the search window and show me the search results" input according to the learning start guide message, as the input sequences.

For example, the electronic device 1000 may store an instruction for performing the response operation, that is, 'execute web browser application', that is the response operation with respect to the user voice such as "open web browser", as an instruction that may be performed in a state in which the home screen is displayed, in the memory of the electronic device in advance. Also, the electronic device 1000 may store instructions for performing response operations such as 'open search window' and 'enter a text Chinese restaurant in search window' that are response operations with respect the user voice such as "enter 'Chinese restaurant' in the search window and show me the search results" in the memory of the electronic device as instructions that may be performed in a state in which the web browser is open.

The electronic device 1000 may determine that the response operation with respect to the user voices such as "open web browser" and "enter 'Chinese restaurant' in the search window and show me the search results" input according to the learning start guide message, execute the web browser application, and input the word 'Chinese restaurant' in the search window in a state in which the web browser is open so as to output a phone number list of Chinese restaurants to the user.

According to an embodiment, when the user voice such as "show me the number of xx Chinese restaurant" is obtained from the user, the electronic device 1000 searches the phone number list of Chinese restaurants for the phone number of xx Chinese restaurant and then may output a message such as "phone number of xx Chinese restaurant is xx-xx-xxx".

According to an embodiment, when the user voice such as "please call xx Chinese restaurant" that has been determined to be impossible to perform the response operation by the electronic device 1000 is received again, the electronic device 1000 ends the learning operation and may output learning complete guide messages such as "learning is finished" and "which instruction do you want to use?".

According to an embodiment, when a preset voice input such as "end learning operation" representing the end of the learning operation is input or when a preset end sequence representing the end of the learning operation is input through the remote control connected to the user input interface of the electronic device or the electronic device through wires or wirelessly, the electronic device 1000 may terminate the learning operation and output the learning end guide message.

Operations of the electronic device 1000 after the voice assistant service model of the electronic device 1000 learns the response operation with respect to the user voice such as "please call xx Chinese restaurant" (520) will be described below with reference to a box 522 and a box 524 shown in FIG. 5B. The electronic device 1000 that has learned the response operation with respect to the user voice such as "please call xx Chinese restaurant" may obtain a first user voice such as "please call xx Chinese restaurant" from the user, but may also obtain a second user voice such as "please call a nearby Chinese restaurant". Here, intent information of the text converted from the first user voice may be identical with intent information of the text converted from the second user voice.

According to an embodiment, while the electronic device 1000 learns the response operation with respect to the user voice such as "please call xx Chinese restaurant", the electronic device 1000 may also learn the response operation with respect to the user voice such as "open web browser" or "enter 'Chinese restaurant' in the search window and show me the search results" that have been input from the user. Therefore, when the user voice such as "please call a nearby Chinese restaurant" that has the same intent information as but has different voice sequences from the user voice "please call xx Chinese restaurant" is input, the electronic device 1000 may execute the web browser application and output a search result after inputting 'Chinese restaurant' in the search window provided by the web browser application.

Also, the electronic device 1000 divides the user voice such as "please call a nearby Chinese restaurant" into a plurality of input groups, e.g., "nearby", "Chinese restaurant", and "please call" including the series of user input sequences according to units of user intention, and may output a response message such as "do you want to call xx?" based on the intent of each input group such as "Chinese restaurant" and "please call" that are similar to some of the input groups in the user voice such as "please call xx Chinese restaurant".

That is, because the electronic device 1000 may train the voice assistant service based on the intent for each sequence in the user voice, the electronic device 1000 may output the response message such as "do you want to call xx Chinese restaurant?" even when the user voice such as "please call a nearby Chinese restaurant", the user intent for sequences of which is not the same as, but may be partially similar to that of the user voice "please call xx Chinese restaurant", thereby improving user's convenience.

Figure 6:
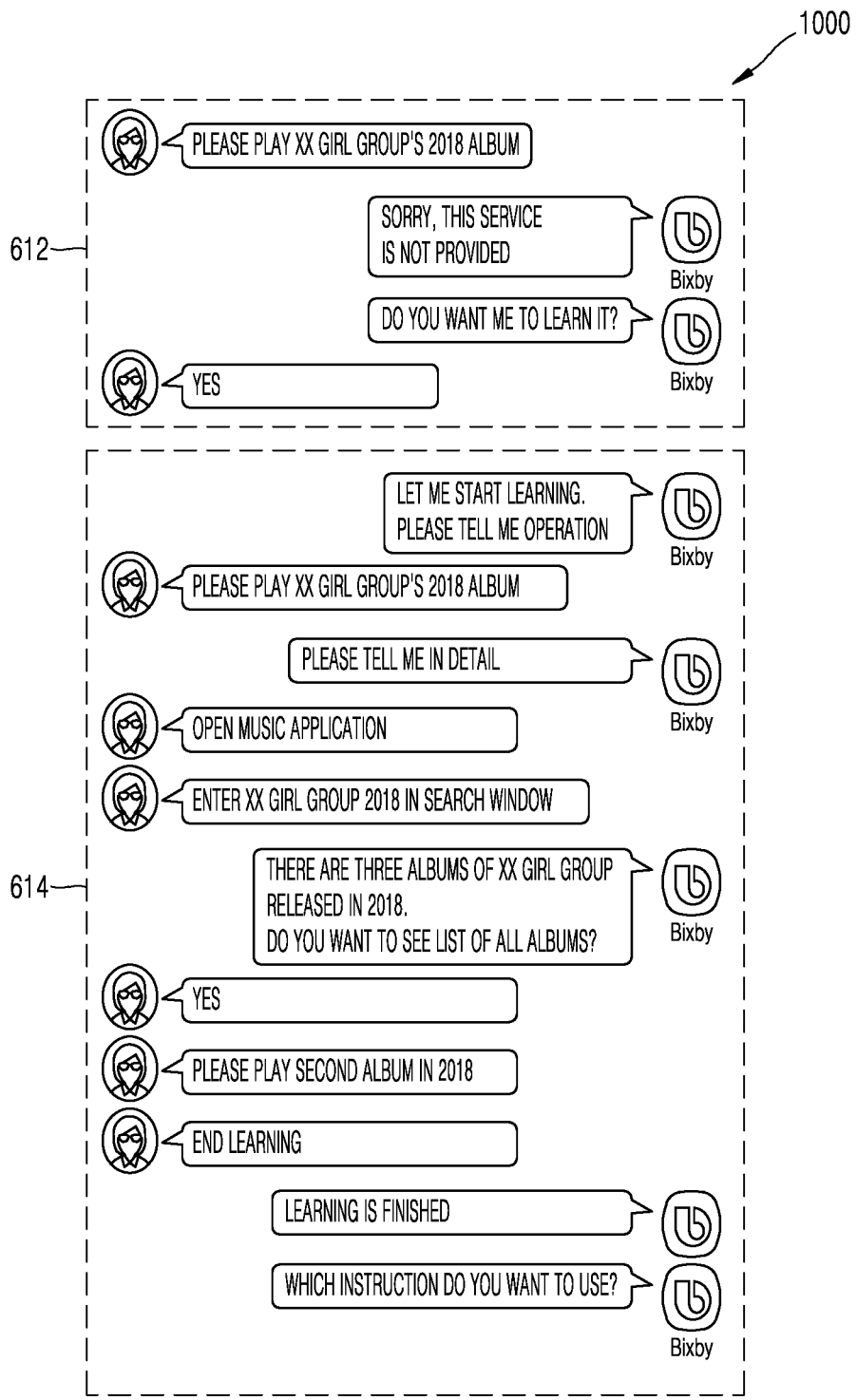
FIG. 6 is a diagram illustrating processes, performed by an electronic device, of learning a voice assistant service, according to an embodiment.

FIG. 6 is a diagram illustrating processes, performed by the electronic device 1000, of learning a voice assistant service, according to an embodiment.

When a user voice such as "please play xx girl group's 2018 album" is input, the electronic device 1000 may determine whether the user voice such as "please play xx girl group's 2018 album" may be recognized by using the ASR model. When the user voice may be recognized, the electronic device 1000 may determine whether a response operation with respect to the user voice is performable based on a probability value of intent information or slot information obtained from a text converted from the user voice by using the NLU model.

Also, even when the probability values of the intent information and the slot information of the text converted from the user voice such as "please play xx girl group's 2018 album" are equal to or greater than a preset threshold value, the electronic device 1000 may determine that the response operation with respect to the user voice is not performable when the user voice is not an instruction about the response operation that is performable in the current operation state of the electronic device or is not an instruction about a predefined response operation.

When it is determined that the response operation with respect to the user voice is not performable, the electronic device 1000 may output an error message such as "sorry, this service is not provided". Also, after outputting the error message, the electronic device 1000 may output a learning confirmation request message that requests user input sequences related to the response operation such as "do you want me to learn it?".

After outputting the learning confirmation message, when the short-answer user voice such as "yes" is input from the user with respect to the output learning confirmation request message, the electronic device 1000 may output the learning start guide message such as "let me start learning, tell me the operation" and may switch to a learning mode. Operations of the electronic device 1000 shown in a box 612 of FIG. 6 may correspond to the operations of the electronic device 1000 shown in the box 512 of FIG. 5A.

Referring to a dialogue box 614, according to an embodiment, after outputting the learning start guide message, the electronic device 1000 may obtain a user voice such as "please play xx girl group's 2018 album", which is not an instruction about the response operation that is performable by the electronic device 1000 in the current operation state of the electronic device. When the user voice that the electronic device 1000 determines that the response operation is not performable is obtained after switching into the learning mode with the output of the learning start guide message, the electronic device 1000 may output a supplementary learning message such as "please tell me in more detail" based on the dialogue management map of the DM model and the AP model determining the operation order of the voice assistant service.

After outputting the supplementary learning message such as "please tell me in more detail", the electronic device 1000 may obtain the user voices such as "please open music application" and "enter xx girl group 2018 album in search window" from the user.

Also, the electronic device 1000 may store an instruction for performing a response operation 'execute music application' that is the response operation with respect to the user voice such as "please open music application" in a state in which the home screen (e.g., first screen after unlock) as an instruction that is performable in the current operation state of the electronic device.

Also, the electronic device 1000 may set the instructions for performing the response operations such as 'open search window' and 'enter xx girl group 2018 album in the search window' as the response operation with respect to the user voice such as "please enter xx girl group 2018 album in the search window", as the instructions about the response operation that is performable by the voice assistant service in a state in which the music application is open.

Therefore, the electronic device 1000 may determine that the response operation with respect to the user voice such as "please open music application" and "please enter xx girl group 2018 album in the search window" after outputting the supplementary learning message, and then, may output a message such as "there are three albums of xx girl group released in 2018, do you want to see a list of all the albums?".

According to the output message such as "there are three albums of xx girl group released in 2018, do you want to see a list of all the albums?", the electronic device 1000 may obtain a user voice such as "yes" and "please play second album released in 2018" from the user. According to the output message such as "there are three albums of xx girl group released in 2018, do you want to see a list of all the albums?", the electronic device 1000 may obtain the user voice such as "please play second album released in 2018" that is different from the initially input user voice "please play xx girl group's 2018 album" from the user.

According to an embodiment, the user voice that is the same as the initially input user voice such as "please play xx girl group's 2018 album" is input again, the electronic device 1000 terminates the training of the voice assistant service and may output a learning end guide message such as "learning is ended" and an instruction setting request message such as "which instruction do you want to use?". However, when the user voice such as "please play second album released in 2018" that is different from the user voice "please play xx girl group's 2018 album" is obtained, the electronic device 1000 may output a learning end guide message such as "learning is ended" and an instruction setting request message such as "which instruction do you want to use?" only when a user voice such as "end learning operation" representing the end of the learning operation is obtained from the user.

Figure 7A:
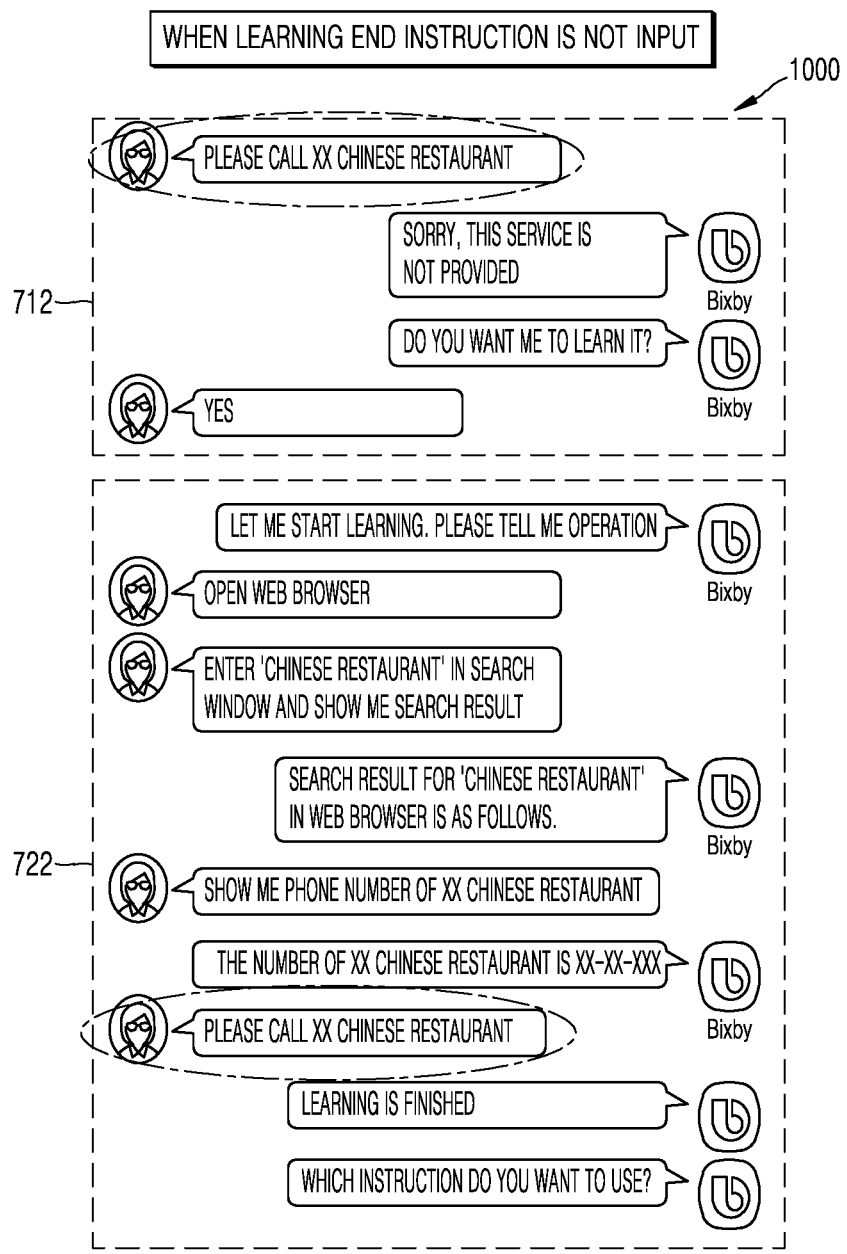
FIGS. 7A and 7B are diagrams illustrating processes, performed by an electronic device, of learning a voice assistant service, according to an embodiment.
Figure 7B:
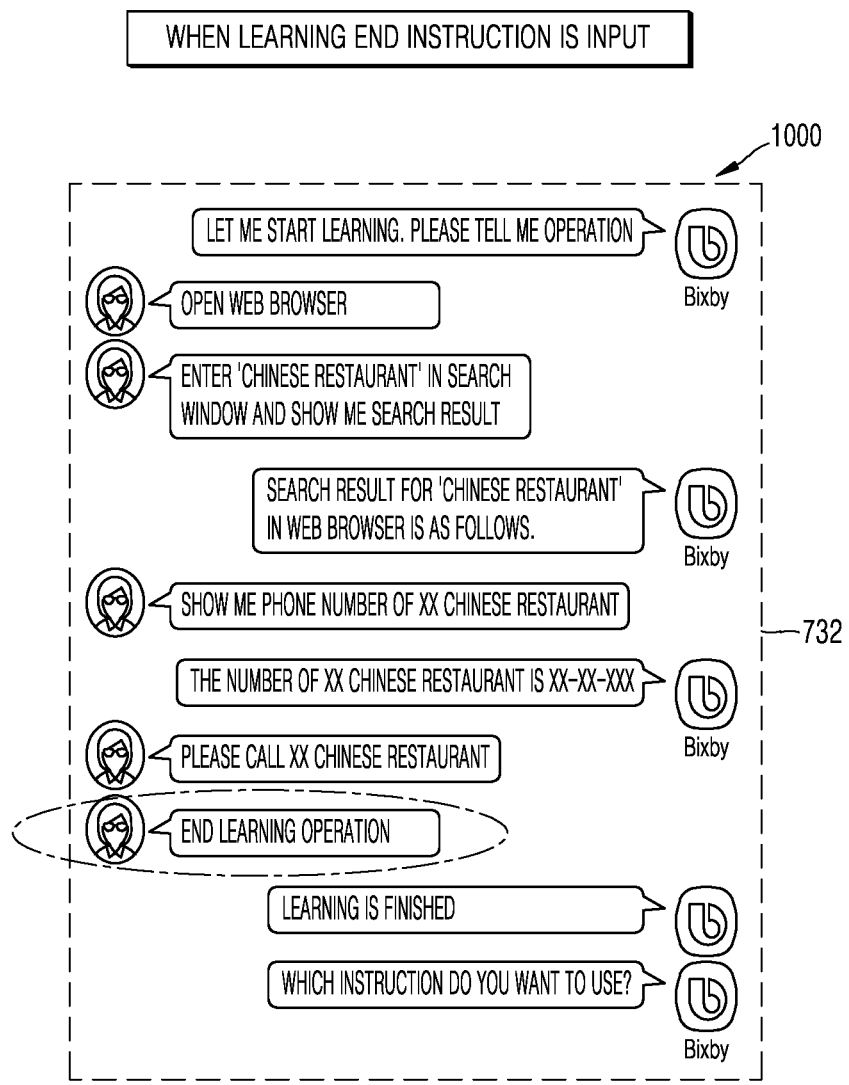

FIGS. 7A and 7B are diagrams illustrating processes, performed by the electronic device 1000, of learning a voice assistant model service, according to an embodiment.

Operations of the electronic device 1000 shown in a box 712 of FIG. 7A may correspond to the operations shown in the box 512 of FIG. 5A, and thus, detailed descriptions thereof are omitted.

Referring to a box 722 of FIG. 7A, after outputting the learning confirmation request message, the electronic device 1000 may output the learning start guide message such as "let me start learning, please tell me the operation" when the short-answer user voice such as "yes" is obtained from the user.

Referring to the box 722 of FIG. 7B, according to the learning start guide message such as "let me start learning, please tell me the operation", the electronic device 1000 may receive a series of input sequences for learning the response operation from the user. For example, the electronic device 1000 may obtain user voices such as "open Web browser", "enter 'Chinese restaurant' in the search window and show me the search results" input according to the learning start guide message, as the input sequences.

For example, the electronic device 1000 may set an instruction for performing the response operation, that is, 'execute web browser application', that is the response operation with respect to the user voice such as "open web browser", as an instruction that is performable in a state in which the home screen is displayed, wherein the instruction is about the response operation that is performable by the voice assistant service. Also, the electronic device 1000 may store instructions for performing response operations such as 'open search window' and 'enter a text Chinese restaurant in search window' that are response operations with respect the user voice such as "enter 'Chinese restaurant' in the search window and show me the search results" in the memory of the electronic device as instructions that is performable in a state in which the web browser is open.

Therefore, the electronic device 1000 may determine that the response operation with respect to the user voices such as "open Web browser" and "enter 'Chinese restaurant' in the search window and show me the search results" input according to the learning start guide message, execute the web browser application, and input the word 'Chinese restaurant' in the search window in a state in which the web browser is open so as to output a phone number list of Chinese restaurants to the user. Also, when the user voice such as "show me the number of xx Chinese restaurant" is obtained from the user, the electronic device 1000 searches the phone number list of Chinese restaurants for the phone number of xx Chinese restaurant and then may output a message such as "phone number of xx Chinese restaurant is xx-xx-xxx".

According to an embodiment, when the user voice such as "please call xx Chinese restaurant" that has been determined to be impossible to perform the response operation by the electronic device 1000 is received again, the electronic device 1000 ends the learning operation and may output learning complete guide messages such as "learning is finished" and "which instruction do you want to use?".

However, referring to a box 732 of FIG. 7B, when a preset voice input such as "learning ended" indicating the end of the learning operation is obtained, the electronic device 1000 ends the learning operation and may output the learning completion guide messages such as "learning is finished" and "which instruction do you want to use?". According to an embodiment, when a preset end sequence indicating the end of the learning operation is input from the user through the user input interface of the electronic device or a remote control connected to the electronic device through wires or wirelessly, the electronic device 1000 may end the learning operation and output the learning completion guide message.

Figure 8:
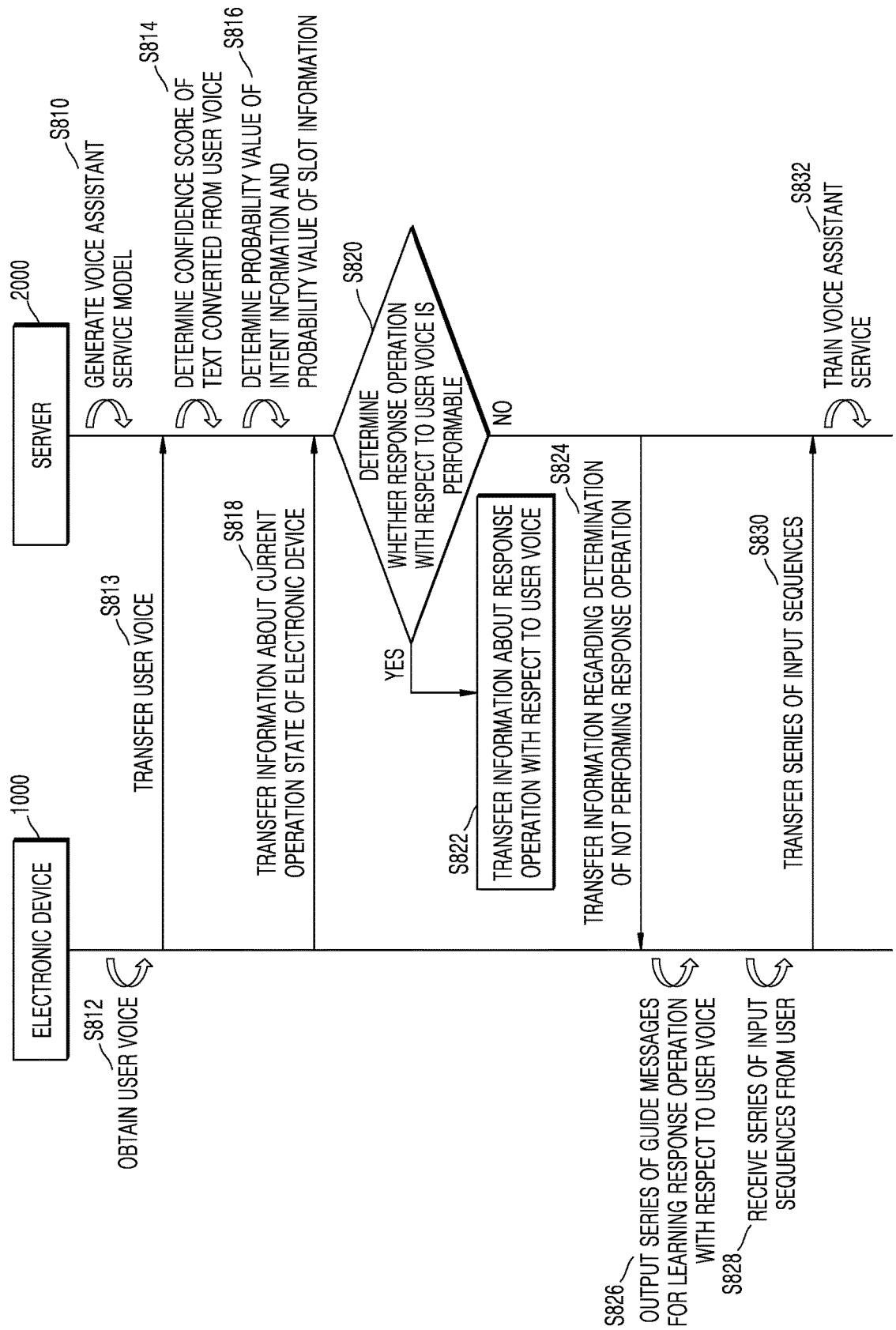
FIG. 8 is a diagram illustrating processes, performed by an electronic device and a server, of providing a voice assistant service, according to an embodiment.

FIG. 8 is a diagram illustrating processes, performed by the electronic device 1000 and the server 2000, of providing a voice assistant service, according to an embodiment.

Referring to FIG. 8, the electronic device 1000 may provide the voice assistant service in communication with the server 2000.

In operation S810, the server 2000 may generate a voice assistant service model for performing a response operation regarding user's voice in advance and may store the voice assistant service model in a memory or a database.

In operation S812, the electronic device 1000 may obtain user voice. Because operation S812 may correspond to operations S210 of FIG. 2, detailed descriptions thereof are omitted.

In operation S813, the electronic device 1000 transfers the user voice to the server 2000. The electronic device 1000 may transfer information about a text converted from the obtained user voice to the server 2000 via a wired or wireless network.

In operation S814, the server 2000 may determine a confidence score of the text converted from the user voice via the ASR model.

In operation S816, the server 2000 may determine a probability value of intent information and a probability value of slot information from the text converted from the user voice via the NLU model.

In operation S818, the server 2000 may receive information about a current operation state of the electronic device from the electronic device 1000. The current operation state of the electronic device 1000 may include information about the functions of the electronic device, which is currently being executed by the electronic device, based on a screen currently displayed by the electronic device 1000, a kind of the application currently being executed by the electronic device, functions included in the application that is being executed currently, an update status of the currently executed application, and a series of user inputs input to the electronic device 1000.

In operation S820, the server 2000 may determine whether the response operation with respect to the user voice is performable. According to an embodiment, the server 2000 may determine that the response operation with respect to the user voice is not performable when the confidence score of the text converted from the user voice obtained through the ASR model is equal to or less than a preset threshold value. Also, when the probability value of the intent information of the text converted from the user voice is equal to or less than a preset threshold value, the server 2000 may determine that the response operation with respect to the user voice is not performable. Also, when the probability value of the slot information of the text converted from the user voice is equal to or less than a preset threshold value, the server 2000 may determine that the response operation with respect to the user voice is not performable.

According to an embodiment, even when the probability value of the intent information and the probability value of the slot information of the text converted from the user voice are greater than the preset threshold value, the server 2000 may determine that the response operation with respect to the user voice is not performable in a case in which a computer-readable instruction corresponding to the intent information and the slot information is not the instruction about the response operation that is performable by the electronic device based on the current operation state of the electronic device.

In an embodiment, the server 2000 converts the user voice received from the electronic device into the text by using the ASR model and the NLU model and determines the probability values of the intent information and the slot information from the converted text, but the process of converting the user voice through the ASR model and the process of determining the probability values of the intent information and the slot information from the text converted from the user voice by using the NLU model may be performed in the electronic device.

Operation S820 may correspond to operation S230 performed by the electronic device 1000 in FIG. 2.

In operation S822, when it is determined that the response operation with respect to the user voice is performable, the server 2000 may transfer information about the response operation with respect to the user voice to the electronic device 1000. The electronic device 1000 may perform the response operation with respect to the user voice by using the information about the response operation received from the server 2000.

In operation S824, when it is determined that the response operation with respect to the user voice is not performable, the server 2000 may transfer to the electronic device information about the determination that the response operation with respect to the user voice is not performable.

In operation S826, the electronic device 1000 outputs the learning start guide message such as "let me start learning, please tell me the operation" for learning the response operation regarding the user voice and is switched to the learning mode, and then a certain SW module, etc. that are necessary for receiving the user input sequence may be activated. According to an embodiment, before outputting the learning start guide message, the electronic device 1000 may output an error message such as "sorry, this service is not provided".

In operation S828, after outputting the learning start guide message, the electronic device 1000 may obtain user voices about at least one function of the electronic device, wherein the function may be executed by using the voice assistant service, from the user as a series of input sequences.

In operation S830, the electronic device 1000 may transfer the series of input sequences obtained from the user to the server 2000. According to an embodiment, after outputting the learning start guide message, the electronic device 1000 may classify the series of user input sequences according to functions of the electronic device, and may further transfer the input sequences classified according to the functions of the electronic device and the input order of the input sequences to the server 2000. In operation S832, the server 2000 trains the voice assistant service. Processes in which the server 2000 trains the voice assistant service based on at least one of the obtained user input sequences, the input order of the user input sequences, or an order among the user input sequences and the series of guide messages may correspond to the processes in which the electronic device trains the voice assistant service model illustrated in FIGS. 2 and 3, and thus, detailed descriptions thereof are omitted.

Figure 9:
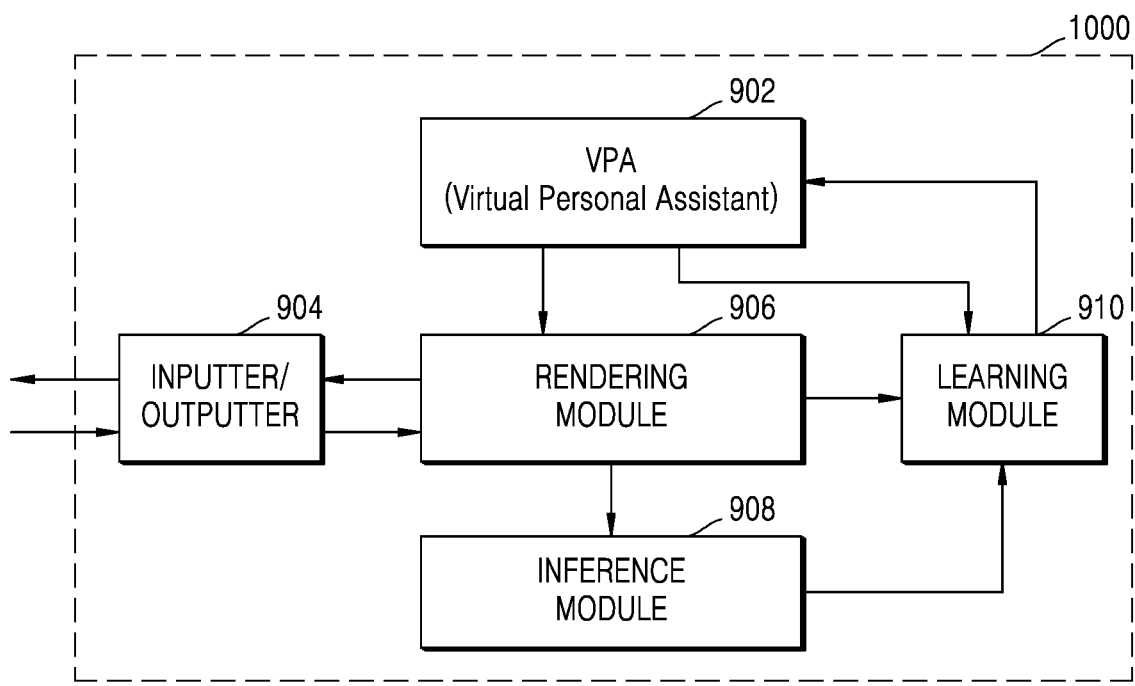
FIG. 9 is a block diagram of an electronic device for providing a voice assistant service according to an embodiment.

FIG. 9 is a block diagram of the electronic device 1000 providing a voice assistant service according to an embodiment.

According to an embodiment, the electronic device 1000 may include a virtual personal assistant (VPA) module 902, an inputter/outputter 904, a rendering module 906, an inference module 908, and a learning module 910. However, not all the elements shown in FIG. 9 are essential elements, that is, the electronic device 1000 may be implemented with elements more than or less than the elements shown in FIG. 9. For example, the electronic device 1000 may include an inputter/outputter 904, a rendering module 906, an inference module 908, and a learning module 910.

According to an embodiment, the VPA module 902 may generate similar sequences to the user input sequences by using a VPA model. According to an embodiment, the VPA model may generate the similar sequences by inputting the series of user input sequences from the user into a language model that receives input of the user input sequence and outputs similar sequences to the input user input sequences.

According to an embodiment, the VPA module 902 may control the inputter/outputter 904 by using the VPA model, so as to receive the user voice about starting or ending of the learning operation, user voice for learning the response operation, other inputs of the user through the remote control connected to the electronic device via wires or wirelessly, etc. Also, the VPA module 902 may control the inputter/outputter 904 to receive visual or audible information regarding the response operation with respect to the user voice from the learning module 910 and to output visual or audible information regarding the response operation to the user.

According to an embodiment, at least one function performed by the VPA module 902 may be distributed to at least one of the learning module 910, the rendering module 906, or the inference module 908 and performed. For example, when the electronic device 1000 does not include the VPA module 902, the function of generating the similar sequences that are similar to the user input sequences input from the user may be performed by a similar sequence generation model in the learning module. The VPA model used by the VPA module 902 according to an embodiment may include all types of software agents that may be performed by a processor in order to process a task required by the user of the electronic device and to provide the user with the voice assistant service.

The inputter/outputter 904 may obtain a user input sequence including at least one of a voice input, a key input, a touch input, or a motion input of the user by controlling the VPA module 902 and the rendering module 906, and may output a response operation with respect to the obtained user input sequence. The rendering module 906 generates a virtual electronic device screen, and records the user input that is input through the virtual electronic device screen or a virtual user input interface of the electronic device in order to determine the current operation state of the electronic device.

According to an embodiment, the rendering module 906 may determine the current operation state of the electronic device based on at least one of the records of the user inputs that have been input through the user input interface, in order to manipulate a screen currently displayed on a display of the electronic device, a kind of an application that is currently being executed on the electronic device, kinds of services that may be selected on the currently executed application, functions of the currently executed application, an update state of the currently executed application, user input records onto the currently executed application, and at least one function of the current electronic device.

According to an embodiment, the rendering module 906 may transfer to the inference module 908 and the learning module 910 information about the record of the user inputs that are input through the user input interface, in order to manipulate the current operation state of the electronic device, or a screen currently displayed on a display of the electronic device, a kind of an application that is currently being executed on the electronic device, functions of the currently executed application, an update state of the currently executed application, user input records onto the currently executed application, and at least one function of the current electronic device, which are used to determine the operation state of the electronic device.

According to an embodiment, the inference module 908 divides a series of user input sequences received from the user based on user input units, by using at least one inference model. The inference module 908 groups the input sequence divided by using the inference model into a plurality of input groups and may identify the plurality of input groups and intent information of the user for each input group.

According to an embodiment, the inference model may identify the user intent for each input group in the user input sequence that is divided by using the Bausian network, but is not limited thereto, that is, the user intent for each group may be identified by using a FOL model. The inference module 908 transfers the input groups and the intent information of the user for each input group to the learning module 910, such that the learning module 910 may train the voice assistant service model based in the input groups and the intent information of the user for each input group. A detailed method of training the inference model used by the inference module 908 correspond to the features illustrated with reference to FIG. 4, and thus, detailed descriptions thereof are omitted.

The learning module 910 may obtain voice analysis information of the user voice or may perform the response operation with respect to the user voice based on the obtained voice analysis information, by using the service model for providing the voice assistant service.

According to an embodiment, the voice assistant service model may include the ASR model, the NLU model, the DM model, the AP model, the NLG model, and the TTS model. The training method of the voice assistant service model used by the learning module 910 and detailed training method of the ASR model, the NLU model, DM model, the AP model, and the TTS model in the voice assistant service model correspond to the descriptions with reference to FIGS. 1A to 4, and detailed descriptions thereof are omitted.

Figure 10:
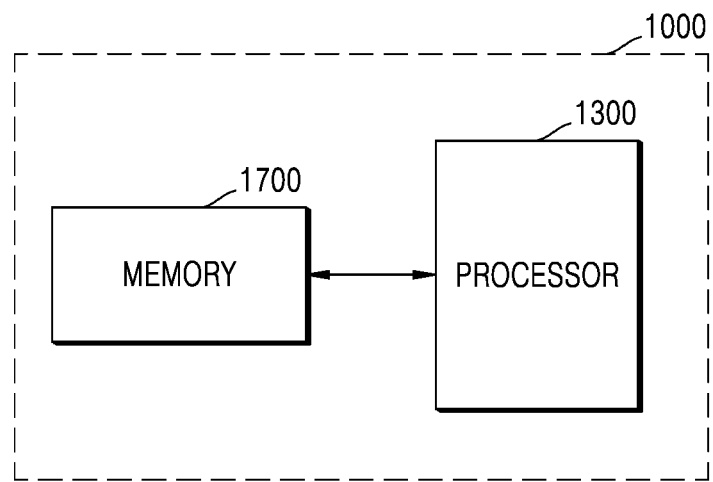
FIG. 10 is a block diagram of an electronic device for providing a voice assistant service according to an embodiment.

FIG. 10 is a block diagram of the electronic device 1000 providing a voice assistant service according to an embodiment.

Figure 11:
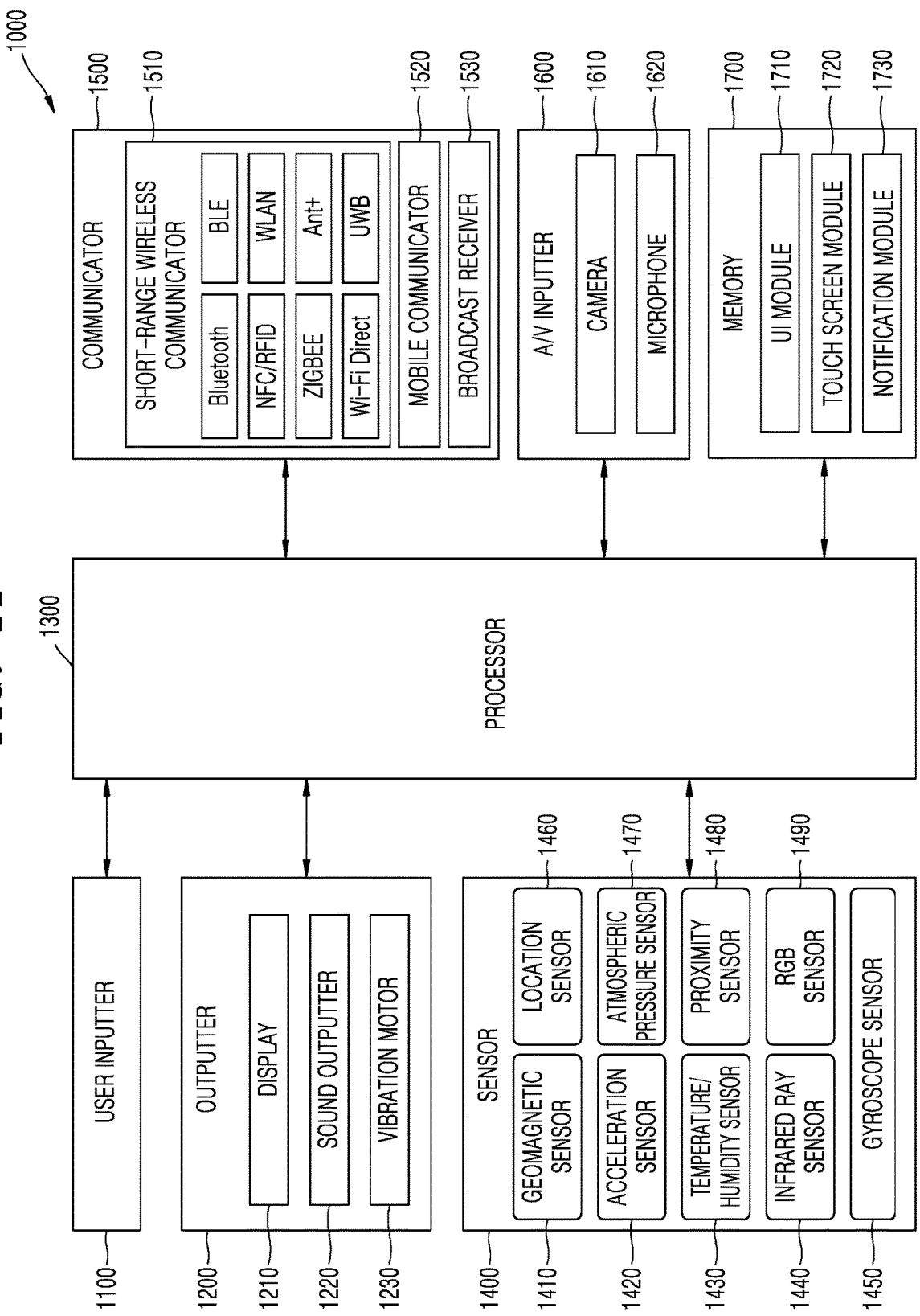
FIG. 11 is a block diagram of an electronic device for providing a voice assistant service according to an embodiment.

FIG. 11 is a block diagram of the electronic device 1000 providing a voice assistant service according to an embodiment.

As shown in FIG. 10, the electronic device 1000 providing the voice assistant service may include a processor 1300 and a memory 1700. However, not all the elements shown in FIG. 9 are essential elements, that is, the electronic device 1000 may be implemented with elements more than or less than the elements shown in FIG. 10.

For example, as shown in FIG. 11, the electronic device 1000 according to an embodiment may further include a sensor 1400, an audio/video (A/V) inputter 1600, and the memory 1700 in addition to a user inputter 1100, an outputter 1200, the processor 1300, and a communicator 1500.

The user inputter 1100 is a unit through which a sequence for controlling the electronic device 1000 is input by the user. For example, the user inputter 1100 may include, but is not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, or the like.

The user inputter 1100 may receive the input sequence from the user, the input sequence is input according to guide messages output on the display by the electronic device 1000. In addition, the user inputter 1100 may obtain the user voice as illustrated in FIGS. 1A to 8, or may receive at least one of the key input, the touch input, or the motion input from the user.

The outputter 1200 may output an audio signal, a video signal, or a vibration signal, and may include a display 1210, the sound outputter 1220, and a vibration motor 1230.

The display 1210 includes a screen for displaying and outputting information processed by the electronic device 1000. In addition, the screen may display a response operation with respect to the user voice as a character image or a video image, e.g., a guide message, an error message, etc.

The sound outputter 1220 outputs audio data transmitted from the communicator 1500 or stored in the memory 1700. Also, the sound outputter 1220 may output an audio signal related to the function (e.g., the error message, the learning start guide message, the learning end guide message, and the instruction setting request message shown in FIG. 6) performed in the electronic device 1000.

The vibration motor 1230 may output a vibration signal. For example, the vibration motor 1230 may output a vibration signal with the output of the function (e.g., the error message, the learning start guide message, the learning end guide message, and the instruction setting request message shown in FIG. 6) performed in the electronic device 1000.

The processor 1300 controls overall operations of the electronic device 1000. For example, the processor 1300 may execute programs stored on the memory 1700 to control the user inputter 1100, the outputter 1200, the sensor 1400, the communicator 1500, the A/V inputter 1600, etc. Also, the processor 1300 executes the programs stored in the memory 1700 to perform the functions of the electronic device 1000 illustrated with reference to FIGS. 1A to 10. Also, the processor 1300 may include one or more processors, and the one or more processors may include a universal processor such as a CPU, AP, digital signal processor (DSP), etc., a graphical processor such as a graphics processing unit (GPU) or a vision processing unit (VPU), or an AI processor such as a neutral processing unit (NPU).

According to an embodiment, when the processor 1300 includes the universal processor, the AI processor, and the graphic processor, the AI processor may be implemented as a separate chip from the universal processor or the graphic processor.

For example, the one or more processors may control input data to be processed according to predefined operational rules or AI model stored in the memory. Alternatively, when the one or more processors include the AI processors, the AI processor may be designed as a hardware structure specified to process a certain AI model.

According to an embodiment, when the processor 1300 includes a plurality of processors, the graphic processor, or the AI processor such as NPU, at least some of the plurality of processors, the graphic processor, or the AI processor such as NPU may be loaded on the electronic device 1000 and/or another electronic device or server connected to the electronic device 1000. The processor 1300 may obtain the user voice by controlling a user inputter. According to an embodiment, the processor 1300 may control the microphone to obtain the user voice. The processor 1300 may execute an application performing operations of the electronic device based on the user input and may obtain the user voice via the executed application. For example, the processor 1300 may execute a voice assistant application and controls the microphone 1620 by using the voice assistant service provided by the executed application to receive the voice input from the user.

According to an embodiment, the processor 1300 may obtain a text converted from the user voice by inputting the user voice into the ASR model, and then may obtain intent information and slot information about the user intent by inputting the text into the NLU model. The processor 1300 may determine whether a response operation with respect to the user voice is performable, based on the obtained intent information, the slot information, and a probability value of the intent information or the slot information.

For example, the processor 1300 may determine that the response operation with respect to the user voice is not performable, when the probability value of the intent information obtained through the NLU model is less than a preset threshold value. Also, the processor 1300 may determine that the response operation with respect to the user voice is not performable, when the probability value of the slot information obtained through the NLU model is less than a preset threshold value.

According to an embodiment, even when the probability value of the intent information or the probability value of the slot information of the text converted from the user voice is equal to or greater than the preset threshold value, the processor 1300 may determine that the response operation with respect to the user voice is not performable in a case where a computer-readable instruction corresponding to the intent information and the slot information of the user voice is not the instruction about the response operation that is performable in the current operation state of the electronic device. When it is determined that the response operation with respect to the user voice is not performable, the processor 1300 may output a series of guide messages for training a response operation regarding the user voice.

However, the processor 1300 may determine that the response operation with respect to the user voice is performable, when the computer-readable instruction corresponding to the intent information and the slot information of the user voice is an instruction about a response operation that is set in advance to be performable by the voice assistant service provider in the current operation state of the electronic device. Whether the computer-readable instruction corresponding to the intent information and the slot information is about the response operation executable in the current operation state of the electronic device may be set in advance by the voice assistant service provider.

According to an embodiment, the operation state of the electronic device may vary depending on at least one of the functions of the electronic device, which is currently being executed by the electronic device, based on a screen currently displayed by the electronic device 1000, a kind of the application currently being executed by the electronic device, functions included in the application that is being executed currently, an update status of the currently executed application, and a series of user inputs input to the electronic device 1000.

Also, the processor 1300 may receive an input sequence input by the user according to a series of output guide messages. Also, the processor 1300 may train the voice assistant service model to learn the response operation by using the input sequence. The voice assistant service model used by the electronic device to provide the response operation with respect to the user voice may include an ASR model, an NLU model, a DM model, an AP model, an NLG model, and a TTS model. The processor 1300 may receive an input sequence including at least one of a voice input, a key input, a touch input, or a motion input from the user, and may train the ASR model, the NLU model, the DM model, the AP model, the NLG model, and the TTS model by using the input sequence.

According to an embodiment, the processor 1300 divides the input sequence into a plurality of input groups by inputting the input sequence to the inference model. The processor 1300 may train the ASR model, the NLU model, the DM model, the AP model, the NLG model, and the TTS model of the voice assistant service model, based on the input groups of the divided input sequence and intent information of the user for each input group.

The processor 1300 may generate a similar sequence related to the input sequence by inputting the input sequence to a language model, and may train the voice assistant service model based on input groups of the similar sequence and intent information of the user for each input group, and input groups of the user input sequence and the intent information of the user for each input group. The method in which the electronic device 1000 trains the ASR model, the NLU model, the DM model, the AP model, the NLG model, and the TTS model based on the input groups and the intent of the user for each input group may correspond to operation S450 of FIG. 4, and thus, detailed descriptions thereof are omitted.

Also, the processor 1300 may transfer the obtained user voice to the server 2000, transfer the input sequence input from the user in response to the output guide message, and may control the communicator 1500 to receive information about the response operation with respect to the user voice from the server 2000, in order to perform the response operation with respect to the user voice in communication with the server 2000.

As described above, the processor 1300 may provide the voice assistant service by using at least one of an AI processor, a graphics process, or a universal processor for providing the voice assistant service.

According to an embodiment, the electronic device 1000 may perform operations of the electronic device, e.g., an operation of obtaining user voice, an operation of displaying a series of guide messages generated as response operations with respect to the user voice on a display, or an operation of receiving a user input through a user input interface by using a universal processor, and may perform an operation of determining whether the response operation with respect to the user voice is performable, an operation of determining a current operation state of the electronic device, an operation of training the voice assistant service model based on a user input sequence input from the user, etc. by using the AI processor, but is not limited thereto.

That is, the electronic device 1000 determines necessary processing resources in executing the method of effectively providing the user interface, and may use at least one of the universal processor, the graphic processor, or the AI processor based on the determined processing resources.

According to an embodiment, predefined operation rules or AI model for operating the electronic device 1000 is obtained through training. Here, obtaining through the training may denote that the predefined operation rules or AI model that is set to execute a desired characteristic (or purpose) is made from a basic AI model that learns a plurality of pieces of learning data through a learning algorithm. The learning may be performed in the device executing the AI operation or may be performed via an additional server and/or system. The learning algorithm may include supervised learning, unsupervised learning, semi-supervised learning, or reinforcement learning, but is not limited thereto.

According to an embodiment, the processor 1300 may pre-process data such as a series of user input sequences input for training an AI model and an order of the user input sequences. For example, the processor may process the obtained data in a preset format. According to an embodiment, the processor may select the learning data according to preset criteria (e.g., a region of generating the learning data, a time of generating the learning data, a size of the learning data, a genre of the learning data, a generator of the learning data, types of objects in the learning data, etc.) for the training of the AI model, and may also learn methods of selecting the criteria of selecting the learning data for the training of AI model.

For example, the AI model used by the electronic device 1000 may include a plurality of neural network layers. Each of the plurality of neural network layers has a plurality of weight values and performs a neural network calculation by calculating a calculation result of a previous layer with the plurality of weight values. The plurality of weight values in each of the plurality of neural network layers may be optimized according to a learning result of the AI model. For example, during the learning process, the plurality of weight values may be updated to reduce or minimize loss values or cost values obtained from the AI model. The AI neural network may include a deep neural network (DNN), for example, a convolutional neural network (CNN), a recurrent neural network (RNN), a restricted Boltzman machine (RBM), a deep belief network (DBN), a bidirectional recurrent deep neural network (BRDNN), or a deep Q-network, but is not limited thereto.

The sensor 1400 senses a status of the electronic device 1000 or a peripheral status of the electronic device 1000 and may transmit sensed information to the processor 1300. The sensor 1400 may be used to generate some of specification information of the electronic device 1000, status information of the electronic device 1000, ambient environment information of the electronic device 1000, status information of a user, motion input and device usage history information of the user.

The sensor 1400 may include, but is not limited to, at least one of a magnetic sensor 1410, an acceleration sensor 1420, a temperature/humidity sensor 1430, an infrared ray sensor 1440, a gyroscope sensor 1450, a location sensor (e.g., a global positioning system (GPS)) 1460, an atmospheric pressure sensor 1470, a proximity sensor 1480, or an RGB sensor (illuminance sensor) 1490. Because one or ordinary skill in the art may intuitively infer functions of the sensors from the sensors' names, detailed descriptions thereof are omitted.

The communicator 1500 may include one or more elements allowing the electronic device 1000 to communicate with another device and the server 2000. Another device may include, but is not limited to, a computing device like the electronic device 1000, or a sensing device. For example, the communicator 1500 may include a short-range wireless communicator 1510, a mobile communicator 1520, and a broadcast receiver 1530.

The short-range wireless communicator 1510 may include, but is not limited to, a Bluetooth communicator, a Bluetooth low energy (BLE) communicator, a near field communication unit, a WLAN (Wi-Fi) communicator, a ZigBee communicator, an infrared-ray data association (IrDA) communicator, a Wi-Fi direct (WFD) communicator, an ultra wideband (UWB) communicator, an Ant+ communicator, etc.

The mobile communicator 1520 may transmit/receive a wireless signal to/from at least one of a base station, an external terminal, or a server on a mobile communication network. Here, the wireless signal may include a voice call signal, a video call signal, or various types of data according to transmission/reception of texts/multimedia messages.

The broadcast receiver 1530 receives a broadcast signal and/or broadcast-related information from outside via a broadcast channel. The broadcast channel may include satellite channels and terrestrial channels. In some embodiments, the electronic device 1000 might not include the broadcast receiver 1530.

According to an embodiment, the communicator 1500 may transfer the user voice, the voice analysis information, and the input sequence to the server according to the control of the processor, and may receive from the server information about the determination that the response operation is not performed or information about the response operation when it is determined that the response operation may be performed.

The A/V inputter 1600 is for inputting an audio signal or a video signal, and may include the camera 1610, the microphone 1620, etc. The camera 1610 may obtain image frames such as a still image, a video, etc. by using an image sensor in a video call mode or a photographing mode. An image captured by the image sensor may be processed by the processor 1300 or an additional image processor. The image captured by the camera 1610 may be used as context information of the user.

The microphone 1620 receives a sound signal from outside and processes the sound signal as electrical voice data. For example, the microphone 1620 may receive a sound signal from an external device or the user. The microphone 1620 may receive a voice input from the user. The microphone 1620 may use various noise cancelling algorithms for cancelling noise generated when receiving the sound signal from the outside.

The memory 1700 may store programs for processing and controlling the processor 1300 and may store data input to or output from the electronic device 1000. Also, the memory 1700 may store an AI model for providing the voice assistant service.

According to an embodiment, the AI model stored in the memory 1700 may include a voice assistant service model including an ASR model, an NLU model, a DM model, an AP model, an NLG model, and a TTS model. Also, the memory 1700 may include a VPA model, an inference model, or a rendering model for managing the current operation state of the electronic device, in addition to the voice assistant service model. In addition, the memory 1700 may store a TTS database for training the TTS model, and an ASR database for training the ASR model.

In addition, the memory 1700 may further store a neural network, layers for specifying a structure of the neural network, and information about weights to the layers. For example, when models based on the neural network are corrected based on the obtained input sequence, the memory 1700 may further store layers of corrected models and information about weights among the layers, as well as the trained neural network.

The memory 1700 may include a storage medium of at least one type of a flash memory type, a hard disk type, a multimedia card micro type, a card type memory (e.g., an SD or XD memory, etc.), random access memory (RAM), static RAM (SRAM), read-only memory (ROM), electrically erasable programmable ROM (EEPROM), programmable ROM (PROM), a magnetic memory, a magnetic disk, or an optical disk.

The programs stored in the memory 1700 may be classified as a plurality of modules according to functions thereof, for example, a UI module 1710, a touch screen module 1720, a notification module 1730, etc.

The UI module 1710 may provide specified UI, GUI, etc. connected to the electronic device 1000 for each application. The touch screen module 1720 senses a touch gesture of the user on the touch screen and may transmit information about the touch gesture to the processor 1300. The touch screen module 1720 according to an embodiment may sense and analyze a touch code. The touch screen module 1720 may be configured as additional hardware including a controller.

The notification module 1730 may generate a signal for notifying occurrence of an event in the electronic device 1000. Examples of the event occurring in the electronic device 1000 may include a call signal reception, a message reception, a key signal reception, a schedule notification, etc. The notification module 1730 may output a notification signal as a video signal through the display 1210, may output a notification signal as an audio signal through the sound outputter 1220, or may output the notification as a vibration signal through the vibration motor 1230.

Figure 12:
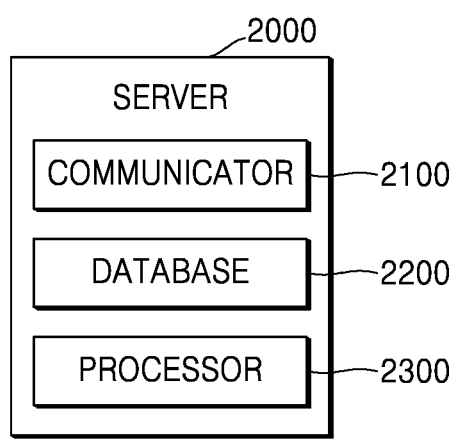
FIG. 12 is a block diagram of a server for providing a voice assistant service according to an embodiment.

FIG. 12 is a block diagram of the server 2000 providing a voice assistant service according to an embodiment.

According to an embodiment, the server 2000 may include a communicator 2100, a database 2200, and a processor 2300.

The communicator 2100 may correspond to the communicator 1500 of the electronic device 1000 shown in FIG. 11. For example, the communicator 2100 may receive the user voice, and a user input sequence for learning a response operation related to the user voice from the electronic device 1000. When it is determined that the response operation with respect to the user voice is performable, the communicator 2100 may transfer information related to the response operation with respect to the user voice to the electronic device 1000. Also, when it is determined that the response operation with respect to the user voice is not performable, the communicator 2100 may transfer to the electronic device 1000 information about the determination that the response operation is not performed.

According to an embodiment, the communicator 2100 may further receive the user voice about at least one function of the electronic device, which may be performed by using the voice assistant service, wherein the user voice is received by the electronic device 1000 after outputting the learning start guide message. Also, the communicator 2100 may further receive user input sequences classified according to the function of the electronic device, wherein the user input sequences are obtained by the electronic device 1000 after outputting the learning start guide message, and an input order of the user input sequences.

The database 2200 may correspond to the memory 1700 of the electronic device 1000 in FIG. 11. For example, the database 2200 may store a voice assistant service model including an ASR model, an NLU model, a DM model, an AP model, an NLG model, and a TTS model. Also, the database 2200 may further store a VPA model for providing the voice assistant service, an inference model, or a rendering model for managing the current operation state of the electronic device.

The processor 2300 controls overall operations of the server 2000. For example, the processor 2300 may execute programs stored in the database 2200 of the server 2000 to control the database 2200, the communicator 2100, etc. Also, the processor 2300 executes the programs stored in the database 2200 to perform the functions of the electronic device 1000 illustrated with reference to FIGS. 1A to 11.

For example, the processor 2300 may output a response operation with respect to the user voice transmitted from the electronic device 1000, by using the voice assistant service. For example, the processor 2300 may determine whether the response operation with respect to the received user voice, and when it is determined that the response operation with respect to the user voice, the processor 2300 may transfer information related to the response operation with respect to the user voice to the electronic device 1000.

Also, when it is determined that the response operation with respect to the user voice is not performable, the processor 2300 may transfer information related to the determination that the response operation with respect to the user voice is not performable to the electronic device 1000. According to an embodiment, the processor 2300 may perform at least some of the functions of the processor in the electronic device 1000 illustrated with reference to FIGS. 1A to 10.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus (e.g., the electronic device 1000). When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

The method according to an embodiment may be recorded in non-transitory computer-readable media including program instructions to implement various operations embodied by a computer. The computer-readable media may also include, alone or in combination with the program commands, data files, data structures, etc. The media and program commands may be those specifically designed and constructed for the purposes, or they may be of the type available to those of skill in the art.

In addition, a computer program device including a recording medium in which a program for performing the method according to an embodiment is stored may be provided. Examples of computer-readable media include magnetic media such as hard disks, floppy disks, and magnetic tape; optical media such as CD ROM disks and DVD; magneto-optical media such as floptical disks; and hardware devices that store and perform program commands, such as ROM, RAM, flash memory, etc. Examples of the program commands may include not only machine language codes but also high-level language codes which are executable by various computing means by using an interpreter.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A method, performed by an electronic device, of providing a voice assistant service, the method comprising:
   obtaining a voice of a user containing an instruction;
   obtaining voice analysis information of the voice of the user by inputting the voice of the user into a natural language understanding model;
   determining that a response operation with respect to the instruction corresponding to the voice of the user is not performable, according to a preset criterion, based on the obtained voice analysis information;
   based on the determining that the response operation is not performable, training at least one artificial intelligence (AI) model associated with the voice assistant service so that the response operation becomes performable by the electronic device,
   wherein the training comprises:
      outputting a series of guide messages for learning the response operation related to the voice of the user, wherein the series of guide messages starts with a start learning message indicating to the user a start of the training of the at least one AI model,
      receiving an input sequence input from the user in correspondence to the series of guide messages, the input sequence comprising user inputs which are input by the user as an ordered sequence which defines a certain order of functions executable by the electronic device, to perform the response operation,
      training the at least one AI model associated with the voice assistant service based on the user inputs defining the certain order of functions executable by the electronic device,
      receiving an end learning command which is provided by the user and instructs to terminate the training, and
      terminating the training based on the end learning command; and
   outputting a learning finished message which informs the user that the response operation is performable by the electronic device,
   wherein the training further comprises:
      dividing the input sequence in units according to time at which each of the user inputs is received, wherein each of the units contains intent information;
      inputting the divided input sequence into an inference model configured to infer an intention of the user with respect to the input sequence;
      grouping the divided input sequence into a plurality of input groups based on the intent information of each of the units, by using the inference model;
      identifying intent information for each of the plurality of input groups by using the inference model; and
      training the at least one AI model associated with the voice assistant service based on the plurality of input groups and the intent information for each of the plurality of input groups.

2. The method of claim 1, wherein the user inputs are input by at least one of a voice input, a key input, a touch input, or a motion input, of the user.

3. The method of claim 1, wherein the voice analysis information comprises at least one of intent information regarding intention of the user or slot information for providing the response operation corresponding to the intention of the user.

4. The method of claim 1, further comprising:
   generating a similar sequence related to the input sequence by inputting the input sequence to a similar sequence generation model; and
   training the at least one AI model associated with the voice assistant service based on the generated similar sequence, the plurality of input groups, and the intent information for each of the plurality of input groups.

5. The method of claim 1, wherein the at least one AI model associated with the voice assistant service is an artificial intelligence algorithm trained by using at least one of a machine learning, a neural network, genes, a deep learning, or a classification algorithm.

6. The method of claim 1, wherein the outputting the series of guide messages further comprises:
   based on a trigger input being input from the user, outputting the series of guide messages.

7. The method of claim 4, wherein the determining whether the response operation with respect to the voice of the user is performable further comprises:
   determining whether the response operation with respect to the voice of the user is performable, by using the at least one AI model associated with the voice assistant service that is trained based on the generated similar sequence, the plurality of input groups, and the intent information for each of the plurality of input groups.

8. An electronic device for providing a voice assistant service, the electronic device comprising:
   a memory storing one or more instructions; and
   at least one processor configured to execute the one or more instructions to:
      obtain a voice of a user containing an instruction,
      obtain voice analysis information of the voice of the user by inputting the voice of the user into a natural language understanding model,
      determine that a response operation with respect to the instruction corresponding to the voice of the user is not performable, according to a preset criterion, based on the obtained voice analysis information, and based on the determining that the response operation is not performable, train at least one artificial intelligence (AI) model associated with the voice assistant service so that the response operation becomes performable by the electronic device, wherein, in the training the at least one AI model associated with the voice assistant service, the at least one processor is further configured to execute the one or more instructions to:
output a series of guide messages for learning the response operation related to the voice of the user, wherein the series of guide messages starts with a start learning message indicating to the user a start of the training of the at least one AI model,
receive an input sequence input from the user in correspondence to the series of guide messages, the input sequence comprising user inputs which are input by the user as an ordered sequence which defines a certain order of functions executable by the electronic device, to perform the response operation,
train the at least one AI model associated with the voice assistant service rebased on the user inputs defining the certain order of functions executable by the electronic device,
receive an end learning command which is provided by the user and instructs to terminate the training,
terminate the training based on the end learning command, and
output a learning finished message which informs the user that the response operation is performable by the electronic device, wherein, in the training the at least one AI model associated with the voice assistant service, the at least one processor is further configured to execute the one or more instructions to:
divide the input sequence in units according to time at which each of the user inputs is received, wherein each of the units contains intent information,
input the divided input sequence into an inference model configured to infer an intention of the user with respect to the input sequence,
group the divided input sequence into a plurality of input groups based on the intent information of each of the units, by using the inference model,
identify intent information for each of the plurality of input groups by using the inference model, and
train the at least one AI model associated with the voice assistant service based on the plurality of input groups and the intent information for each of the plurality of input groups.

9. The electronic device of claim 8, wherein the user inputs are input by at least one of a voice input, a key input, a touch input, or a motion input, by the user.

10. The electronic device of claim 8, wherein the voice analysis information comprises at least one of intent information regarding an intention of the user or slot information for providing the response operation corresponding to the intention of the user.

11. The electronic device of claim 8, wherein the at least one processor is further configured to execute the one or more instructions to:
generate a similar sequence related to the input sequence by inputting the input sequence into a similar sequence generation model, and
train the at least one AI model associated with the voice assistant service based on the generated similar sequence, the plurality of input groups, and the intent information for each of the plurality of input groups.

12. The electronic device of claim 8, wherein the at least one AI model associated with the voice assistant service is an artificial intelligence algorithm trained by using at least one of a machine learning, a neural network, genes, deep learning, or a classification algorithm.

13. The electronic device of claim 8, wherein the at least one processor is further configured to execute the one or more instructions to output the series of guide messages based on a trigger input being input from the user.

14. A non-transitory computer-readable recording medium having stored therein a program which, when executed by a processor, causes the processor to execute a method of providing voice assistant service, the method including:
obtaining a voice of a user containing an instruction;
obtaining voice analysis information of the voice of the user by inputting the voice of the user to a natural language understanding model;
determining that a response operation with respect to the instruction corresponding to the voice of the user is not performable, according to a preset criterion, based on the obtained voice analysis information;
based on the determining that the response operation is not performable, training at least one artificial intelligence (AI) model associated with the voice assistant service so that the response operation becomes performable by an electronic device,
wherein the training comprises:
outputting a series of guide messages for learning the response operation related to the voice of the user, wherein the series of guide messages starts with a start learning message indicating to the user a start of the training of the at least one AI model,
receiving an input sequence input from the user in correspondence to the series of guide messages, the input sequence comprising user inputs which are input by the user as an ordered sequence which defines a certain order of functions executable by the electronic device, to perform the response operation,
training the at least one AI model associated with the voice assistant service based on the user inputs defining the certain order of functions executable by the electronic device,
receiving an end learning command which is provided by the user and instructs to terminate the training, and
terminating the training based on the end learning command; and
outputting a learning finished message which informs the user that the response operation is performable by the electronic device,
wherein the training further comprises:
dividing the input sequence in units according to time at which each of the user inputs is received, wherein each of the units contains intent information;
inputting the divided input sequence into an inference model configured to infer an intention of the user with respect to the input sequence;
grouping the divided input sequence into a plurality of input groups based on the intent information of each of the units, by using the inference model;
identifying intent information for each of the plurality of input groups by using the inference model; and training the at least one AI model associated with the voice assistant service based on the plurality of input groups and the intent information for each of the plurality of input groups.

* * * * *